(12) United States Patent
Johnson

(10) Patent No.: US 6,862,091 B2
(45) Date of Patent: Mar. 1, 2005

(54) ILLUMINATION DEVICE AND METHOD FOR SPECTROSCOPIC ANALYSIS

(75) Inventor: Robert D. Johnson, Albuquerque, NM (US)

(73) Assignee: InLight Solutions, Inc., Albuquerque, NM (US)

( * ) Notice: Subject to any disclaimer, the term of this patent is extended or adjusted under 35 U.S.C. 154(b) by 320 days.

(21) Appl. No.: 09/832,586

(22) Filed: Apr. 11, 2001

(65) Prior Publication Data
US 2003/0007147 A1 Jan. 9, 2003

(51) Int. Cl.$^7$ .................................................. G01J 3/28
(52) U.S. Cl. ........................ 356/326; 356/319; 356/320; 356/321; 356/322; 356/323; 356/325; 356/328
(58) Field of Search ................................ 356/319–323, 356/325–326, 328

(56) References Cited

U.S. PATENT DOCUMENTS

| | | | |
|---|---|---|---|
| 3,910,701 A | | 10/1975 | Henderson et al. |
| 4,035,083 A | | 7/1977 | Woodriff et al. |
| 4,142,797 A | | 3/1979 | Astheimer |
| 4,169,676 A | | 10/1979 | Kaiser |
| 4,260,220 A | | 4/1981 | Whitehead |
| 4,285,596 A | | 8/1981 | Landa |
| 4,305,640 A | * | 12/1981 | Cullis et al. .............. 219/121.6 |
| 4,319,830 A | * | 3/1982 | Roach ........................... 355/1 |
| 4,427,889 A | | 1/1984 | Muller |
| 4,537,484 A | | 8/1985 | Fowler |
| 4,598,715 A | | 7/1986 | Machler et al. |
| 4,653,880 A | | 3/1987 | Sting et al. |
| 4,654,530 A | | 3/1987 | Dybwad |
| 4,655,225 A | | 4/1987 | Dahne et al. |
| 4,656,562 A | | 4/1987 | Sugino |
| 4,657,397 A | | 4/1987 | Oehler et al. |
| 4,661,706 A | | 4/1987 | Messerschmidt et al. |
| 4,669,878 A | * | 6/1987 | Meier .......................... 356/319 |

(List continued on next page.)

FOREIGN PATENT DOCUMENTS

| | | |
|---|---|---|
| EP | 0 426 358 B1 | 5/1991 |
| EP | 0 449 335 A2 | 10/1991 |
| EP | 0 573 137 A2 | 12/1993 |

(List continued on next page.)

OTHER PUBLICATIONS

Hawthorn, David G. et al., "Transmittance of Skew Rays Through Metal Light Pipes," *Applied Optics*, vol., 38, May 1, 1999, pp. 2787–2794.

Anderson, C. E. et al., "Fundamentals of Calibration Transfer Through Procrustes Analysis," *Appln. Spectros.*, vol. 53, No. 10 (1999) p. 1268.

Ashbourn, Julian, *Biometrics: Advanced Identity Verification*, Springer, 2000, pp. 63–64).

(List continued on next page.)

*Primary Examiner*—Diane I. Lee
*Assistant Examiner*—Seung H Lee
(74) *Attorney, Agent, or Firm*—Crompton, Seager & Tufte, LLC

(57) ABSTRACT

An illumination subsystem for use in optical analysis which provides spatially and angularly homogenized radiation to the sample being analyzed. The system eliminates the illumination system as an interferent in the overall optical analysis. Thus, modest translations or rotations of the illumination source or changing the illumination source does not require recalibration of the instrument or prior modeling of illumination variability due to such changes. Illumination stability is achieved by incorporating a light pipe which both angularly and spatially homogenizes the light. Further, a series of filters and/or lenses are incorporated to provide bandpass filtering which eliminates unwanted wavelengths or bands of wavelengths from contacting the tissue and allows for a higher signal-to-noise ratio when the sample is tissue, while preventing thermal damage.

23 Claims, 36 Drawing Sheets

U.S. PATENT DOCUMENTS

| | | |
|---|---|---|
| 4,684,255 A | 8/1987 | Ford |
| 4,712,912 A | 12/1987 | Messerschmidt |
| 4,730,882 A | 3/1988 | Messerschmidt |
| 4,787,013 A | 11/1988 | Sugino et al. |
| 4,787,708 A | 11/1988 | Whitehead |
| 4,830,496 A | 5/1989 | Young |
| 4,853,542 A | 8/1989 | Milosevic et al. |
| 4,857,735 A | 8/1989 | Noller |
| 4,859,064 A | 8/1989 | Messerschmidt et al. |
| 4,866,644 A | 9/1989 | Shenk et al. |
| 4,867,557 A | 9/1989 | Takatani et al. |
| 4,882,492 A | 11/1989 | Schlager |
| 4,883,953 A | 11/1989 | Koashi et al. |
| 4,975,581 A | 12/1990 | Robinson et al. |
| 5,015,100 A | 5/1991 | Doyle |
| 5,019,715 A | 5/1991 | Sting et al. |
| 5,028,787 A | 7/1991 | Rosenthal et al. |
| 5,051,602 A | 9/1991 | Sting et al. |
| 5,051,901 A * | 9/1991 | Endo .......................... 702/19 |
| 5,059,013 A | 10/1991 | Jain |
| 5,068,536 A | 11/1991 | Rosenthal |
| 5,070,874 A | 12/1991 | Barnes et al. |
| 5,109,465 A | 4/1992 | Klopotek |
| 5,158,082 A | 10/1992 | Jones |
| 5,178,142 A | 1/1993 | Harjunmaa et al. |
| 5,179,951 A | 1/1993 | Knudson |
| 5,184,248 A | 2/1993 | de Vaan et al. |
| 5,204,532 A | 4/1993 | Rosenthal |
| 5,218,660 A * | 6/1993 | Omata ........................ 385/116 |
| 5,222,496 A | 6/1993 | Clarke et al. |
| 5,223,715 A | 6/1993 | Taylor |
| 5,225,678 A | 7/1993 | Messerschmidt |
| 5,243,546 A | 9/1993 | Maggard |
| 5,257,086 A | 10/1993 | Fateley et al. |
| 5,267,152 A | 11/1993 | Yang et al. |
| 5,268,749 A | 12/1993 | Weber et al. |
| 5,290,169 A | 3/1994 | Friedman et al. |
| 5,291,560 A | 3/1994 | Daugman |
| 5,303,026 A | 4/1994 | Strobl et al. |
| 5,311,021 A | 5/1994 | Messerschmidt |
| 5,313,941 A | 5/1994 | Braig et al. |
| 5,321,265 A | 6/1994 | Block |
| 5,331,958 A | 7/1994 | Oppenheimer |
| 5,348,003 A | 9/1994 | Caro |
| 5,355,880 A | 10/1994 | Thomas et al. |
| 5,360,004 A | 11/1994 | Purdy et al. |
| 5,361,758 A | 11/1994 | Hall et al. |
| 5,372,135 A | 12/1994 | Mendelson et al. |
| 5,379,764 A | 1/1995 | Barnes et al. |
| 5,402,778 A | 4/1995 | Chance |
| 5,419,321 A | 5/1995 | Evans |
| 5,435,309 A | 7/1995 | Thomas et al. |
| 5,441,053 A | 8/1995 | Lodder et al. |
| 5,452,723 A | 9/1995 | Wu et al. |
| 5,459,317 A | 10/1995 | Small et al. |
| 5,459,677 A | 10/1995 | Kowalski et al. |
| 5,460,177 A | 10/1995 | Purdy et al. |
| 5,483,335 A | 1/1996 | Tobias |
| 5,494,032 A | 2/1996 | Robinson et al. |
| 5,515,847 A | 5/1996 | Braig et al. |
| 5,523,054 A | 6/1996 | Switalski et al. |
| 5,526,120 A * | 6/1996 | Jina et al. ................... 356/446 |
| 5,533,509 A | 7/1996 | Koashi et al. |
| 5,537,208 A | 7/1996 | Bertram et al. |
| 5,552,997 A | 9/1996 | Massart |
| 5,572,613 A * | 11/1996 | Kingsbury .................. 385/24 |
| 5,596,992 A | 1/1997 | Haaland et al. |
| 5,606,164 A | 2/1997 | Price et al. |
| 5,636,633 A | 6/1997 | Messerschmidt et al. |
| 5,655,530 A | 8/1997 | Messerschmidt |
| 5,672,864 A | 9/1997 | Kaplan |
| 5,672,875 A | 9/1997 | Block et al. |
| 5,677,762 A | 10/1997 | Ortyn et al. |
| 5,708,593 A | 1/1998 | Saby et al. |
| 5,719,950 A | 2/1998 | Osten et al. |
| 5,724,268 A | 3/1998 | Sodickson et al. |
| 5,743,262 A | 4/1998 | Lepper, Jr. et al. |
| 5,747,806 A | 5/1998 | Khalil |
| 5,750,994 A | 5/1998 | Schlager |
| 5,782,755 A | 7/1998 | Chance et al. |
| 5,792,050 A | 8/1998 | Alam et al. |
| 5,792,053 A | 8/1998 | Skladner et al. |
| 5,792,668 A * | 8/1998 | Fuller et al. ................. 436/149 |
| 5,793,881 A | 8/1998 | Stiver et al. |
| 5,808,739 A | 9/1998 | Turner et al. |
| 5,818,048 A | 10/1998 | Sodickson et al. |
| 5,823,951 A | 10/1998 | Messerschmidt et al. |
| 5,828,066 A | 10/1998 | Messerschmidt |
| 5,830,132 A | 11/1998 | Robinson |
| 5,830,133 A | 11/1998 | Osten et al. |
| 5,850,623 A | 12/1998 | Carman, Jr. et al. |
| 5,853,370 A | 12/1998 | Chance et al. |
| 5,860,421 A | 1/1999 | Eppstein et al. |
| 5,886,347 A | 3/1999 | Inoue et al. |
| 5,902,033 A | 5/1999 | Levis et al. |
| 5,914,780 A | 6/1999 | Turner et al. |
| 5,933,792 A | 8/1999 | Andersen et al. |
| 5,935,062 A | 8/1999 | Messerschmidt et al. |
| 5,945,676 A | 8/1999 | Khalil |
| 5,949,543 A | 9/1999 | Bleier et al. |
| 5,957,841 A | 9/1999 | Maruo et al. |
| 5,961,449 A | 10/1999 | Toida et al. |
| 5,963,319 A | 10/1999 | Jarvis et al. |
| 6,005,722 A | 12/1999 | Butterworth et al. |
| 6,016,435 A | 1/2000 | Maruo et al. |
| 6,025,597 A | 2/2000 | Sterling et al. |
| 6,026,314 A | 2/2000 | Amerov et al. |
| 6,031,609 A | 2/2000 | Funk et al. |
| 6,034,370 A | 3/2000 | Messerschmidt |
| 6,040,578 A | 3/2000 | Malin et al. |
| 6,041,247 A | 3/2000 | Weckstrom et al. |
| 6,041,410 A | 3/2000 | Hsu et al. |
| 6,043,492 A | 3/2000 | Lee et al. |
| 6,044,285 A | 3/2000 | Chaiken et al. |
| 6,045,502 A | 4/2000 | Eppstein et al. |
| 6,046,808 A | 4/2000 | Fately |
| 6,049,727 A | 4/2000 | Crothall |
| 6,056,738 A | 5/2000 | Marchitto et al. |
| 6,057,925 A | 5/2000 | Anthon |
| 6,058,352 A * | 5/2000 | Lu et al. ...................... 702/28 |
| 6,061,581 A | 5/2000 | Alam et al. |
| 6,061,582 A | 5/2000 | Small et al. |
| 6,066,847 A | 5/2000 | Rosenthal |
| 6,070,093 A | 5/2000 | Oosta et al. |
| 6,073,037 A | 6/2000 | Alam et al. |
| 6,088,605 A | 7/2000 | Griffith et al. |
| 6,100,811 A | 8/2000 | Hsu et al. |
| 6,115,673 A | 9/2000 | Malin et al. |
| 6,141,101 A | 10/2000 | Bleier et al. |
| 6,147,749 A | 11/2000 | Kubo et al. |
| 6,152,876 A | 11/2000 | Robinson et al. |
| 6,157,041 A | 12/2000 | Thomas et al. |
| 6,175,407 B1 | 1/2001 | Sartor |
| 6,212,424 B1 | 4/2001 | Robinson |
| 6,226,541 B1 | 5/2001 | Eppstein et al. |
| 6,230,034 B1 | 5/2001 | Messerschmidt et al. |
| 6,236,459 B1 * | 5/2001 | Negahdaripour et al. ... 356/496 |
| 6,240,306 B1 | 5/2001 | Rohrscheib et al. |
| 6,241,663 B1 | 6/2001 | Wu et al. |

FOREIGN PATENT DOCUMENTS

| | | |
|---|---|---|
| EP | 0 631 137 A2 | 12/1994 |
| EP | 0 670 143 A1 | 9/1995 |
| EP | 0 681 166 A1 | 11/1995 |
| EP | 0 757 243 A1 | 2/1997 |
| EP | 0 764 862 A1 | 3/1997 |
| EP | 0 788 000 A2 | 8/1997 |
| EP | 0 801 297 A1 | 10/1997 |
| EP | 0 836 083 A1 | 4/1998 |
| EP | 0 843 986 A2 | 5/1998 |
| EP | 0 869 348 A2 | 10/1998 |
| EP | 0 897 691 A2 | 2/1999 |
| EP | 0 317 121 B1 | 5/1999 |
| EP | 0 982 583 A1 | 3/2000 |
| EP | 0 990 945 A1 | 4/2000 |
| GB | 2 037 000 A | 7/1980 |
| WO | WO 86/00406 | 1/1986 |
| WO | WO 92/00513 | 1/1992 |
| WO | WO 92/17765 | 10/1992 |
| WO | WO 93/00855 | 1/1993 |
| WO | WO 93/07801 | 4/1993 |
| WO | WO 95/22046 | 8/1995 |
| WO | WO 97/23159 | 7/1997 |
| WO | WO 97/27800 | 8/1997 |
| WO | WO 97/28437 | 8/1997 |
| WO | WO 97/28438 | 8/1997 |
| WO | WO 98/01071 | 1/1998 |
| WO | WO 98/37805 | 9/1998 |
| WO | WO 98/40723 | 9/1998 |
| WO | WO 99/09395 | 2/1999 |
| WO | WO 99/37203 | 7/1999 |
| WO | WO 99/43255 | 9/1999 |
| WO | WO 99/46731 | 9/1999 |
| WO | WO 99/55222 | 11/1999 |
| WO | WO 99/56616 | 11/1999 |
| WO | WO 01/15596 | 3/2001 |

OTHER PUBLICATIONS

Bantle, John P. et al., "Glucose Measurement in Patients with Diabetes Mellitus with Dermal Interstitial Fluid," Copyright © 1997 by Mosby–Year Book, Inc., 9 pages.

Blank, T.B. et al., "Transfer of Near–Infrared Multivariate Calibrations Without Standards," *Anal. Chem.*, vol. 68 (1996) p. 2987.

Brasunas John C. et al., "Uniform Time–Sampling Fourier Transform Spectroscopy," *Applied Optics*, vol. 36, No. 10, Apr. 1, 1997, pp. 2206–2210.

Brault, James W., "New Approach to High–Precision Fourier Transform Spectrometer Design," *Applied Optics*, Vo. 35, No. 16, Jun. 1, 1996, pp. 2891–2896.

Cassarly, W.J. et al., "Distributed Lighting Systems: Uniform Light Delivery," *Source Unknown*, pp. 1698–1702.

Chang, Chong–Min et al., "An Uniform Rectangular Illuminating Optical System for Liquid Crystal Light Valve Projectors," *Euro Display '96* (1996) pp. 257–260.

Coyne, Lawrence J. et al., "Distributive Fiber Optic couplers Using Rectangular Lightguides as Mixing Elements," Information Gatekeepers, Inc. Brookline, MA. 1979) pp. 160–164.

de Noord, Onno E., "Multivariate Calibration Standardization," *Chemometrics and Intelligent Laboratory Systems 25*, (1994) pp. 85–97.

Despain, Alvin M. et al., "A Large–Aperture Field–Widened Interferometer–Spectrometer for Airglow Studies," Aspen International Conference on Fourier Spectroscopy, 1970, pp. 293–300.

Faber, Nicolaas, "Multivariate Sensitivity for the Interpretation of the Effect of Spectral Pretreatment Methods on Near–Infrared Calibration Model Predictions," *Analytical Chemistry*, vol. 71, No. 3, Feb. 1, 1999, pp. 557–565.

Geladi, Paul et al., A Multivariate NIR Study of Skin Alterations in Diabetic Patients as Compared to Control Subjects, *J. Nera Infrared Spectrosc.*, vol. 8 (2000) pp. 217–227.

Haaland, David M. et al. "Reagentless Near–Infrared Determination of Glucose in Whole Blood Using Multivariate Calibration," *Applied Spectroscopy*, vol. 46, No. 10 (1992) pp. 1575–1578.

Harsit, M. et al., "Chapter 5—Instrumental Considerations" *Hadamard Transform Optics*, Academic Press (1979) pp. 109–145.

Heise H. Michael et al., "Near–Infrared Reflectance Spectroscopy for Noninvasive Monitoring of Metabolites," *Clin. Chem. Lab. Med. 2000*, 38(2) (2000) pp. 137–145.

Heise, H.M. et al., "Near Infrared Spectrometric Investigation of Pulsatile Blood Flow for Non–Invasive Metabolite Monitoring," *CP430, Fourier Transform Spectroscopy: 11th International Conference*, (1998) pp. 282–285.

Heise, H.M. et al., "Noninvasive Blood Glucose Sensors Based on Near–Infrared Spectroscopy," *Artif Organs*, vol. 18, No. 6 (1994) pp. 1–9.

Heise, H.M. "Non–Invasive Monitoring of Metabolites Using Near Infrared Spectroscopy: State of the Art," *Horm. Metab. Res.*, vol. 28 (1996) pp. 527–534.

Hopkins, George W. et al., "In–vivo NIR Diffuse–reflectance Tissue Spectroscopy of Human Subjects," *SPIE*, vol. 3597, Jan. 1999, pp. 632–641.

Jagemann, Kay–Uwe et al. "Application of Near–Infrared Spectroscopy for Non–Invasive Determination of Blood/Tissue Glucose Using Neural Networks," *Zeitschrift for Physikalische Chemie*, Bd.191, S. 179–190 (1995).

Khalil, Omar S., "Spectroscopic and Clinical Aspects of Noninvasive Glucose Measurements," *Clinical Chemistry*, 45:2 (1999) pp. 165–177.

Kohl, Matthias et al., "The Influence of Glucose Concentration Upon the Transport of Light in Tissue–simulating Phantoms," *Phys. Med. Biol.*, vol. 40 (1995) pp. 1267–1287.

Korte, E.H. et al., "Infrared Diffuse Reflectance Accessory for Local Analysis on Bulky Samples," *Applied Spectroscopy*, vol. 42, No. 1, Jan. 1988, pp. 38–43.

Kumar, G. et al., "Optimal Probe Geometry for Near–Infrared Spectroscopy of Biological Tissue," *Applied Spectroscopy*, vol. 36 (1997) p. 2286.

Lorber, Avraham et al., "Local Centering in Multivariate Calibration," *Journal of Chemometrics*, vol. 10 (1996) pp. 215–220.

Lorber, Avraham et al., "Net Analyte Signal Calculation in Multivariate Calibration," *Analytical Chemistry*, vol. 69, No. 8, Apr. 15, 1997, pp. 1620–1626.

Marbach, Ralf, "Measurement Techniques for IR Spectroscopic Blood Glucose Determination," (1994) pp. 1–158.

Marbach, R. et al. "Noninvasive Blood Glucose Assay by Near–Infrared Diffuse Reflectance Spectroscopy of the Human Inner Lip," *Applied Spectroscopy*, vol. 47, No. 7 (1993) pp. 875–881.

Marbach, R. et al. "Optical Diffuse Relfectance Accessory for Measurements of Skin Tissue by Near–Infrared Spectroscopy," *Applied Optics*, vol. 34, No. 4, Feb. 1, 1995, pp. 610–621.

Mardia, K.V. et al., *Multivariate Analysis*, Academic Press (1979) pp. 300–325.

Martens, Harald et al., Updating Multivariate Calibrations of Process NIR Instruments, *Adv. Instru. Control* (1990) pp. 371–381.

McIntosh, Bruce C. et al. Quantitative Reflectance Spectroscopy in the Mid–IR, *16th Annual FACSS Conference*, Oct. 1989.

Nichols, et al., *Design and Testing of a White–Light, Steady–State Diffuse Reflectance Spectrometer for Determination of Optical Properties of Highly Scattering Systems*, Applied Optics, Jan. 1, 1997, 36(1), pp 93–104.

Offner, A., "New Concepts in Projection Mask Aligners," *Optical Engineering*, vol. 14, No. 2, Mar.–Apr. 1975, pp. 130–132.

Osborne, B.G. et al., Optical Matching of Near Infrared Reflectance Monochromator Instruments for the Analysis of Ground and Whole Wheat, *J. Near Infrared Spectrosc.*, vol. 7 (1999) p. 167.

Ozdemir, d. et al., "Hybrid Calibration Models: An Alternative To Calibration Transfer," *Appl. Spectros.*, vol. 52, No. 4 (1998) p. 599.

Powell, J.R. et al, "An Algorithm for the Reproducible Spectral Subtraction of Water from the FT–IR Spectra of Proteins in Dilute Solutions and Adsorbed Monolayers," *Applied Spectroscopy*, vol. 40, No. 3 (1986) pp. 339–344.

Ripley, B.D. *Pattern Recognition and Neural Networks*, Cambridge University Press (1996), pp. 91–120.

Robinson, M. Ries et al., "Noninvasive Glucose Monitoring in Diabetic Patients: A Preliminary Evaluation," *Clinical Chemistry*, vol. 38, No. 9 (1992) pp. 1618–1622.

Royston, David D. et al., "Optical Properties of Scattering and Absorbing Materials Used in the Development of Optical Phantoms at 1064 NM," *Journal of Biomedical Optics*, vol. 1, No. 1, Jan. 1996, pp. 110–116.

Rutan, Sarah C. et al., "Correction for Drift in Multivariate Systems Using the Kalman Filter," *Chemometrics and Intelligent Laboratory Systems 35*, (1996) pp. 199–211.

Salit, M.L. et al., "Heuristic and Statistical Algorithms for Automated Emission Spectral Background Intensity Estimation," *Applied Spectroscopy*, vol. 48, No. 8 (1994) pp. 915–925.

Saptari, Vidi Alfandi, "Analysis, Design and Use of a Fourier–Transform Spectrometer for Near Infrared Glucose Absorption Measurement," (Massachusetts Institute of Technology, 1999) pp. 1–76.

Schmitt, J.M. et al., "Spectral Distortions in Near–Infrared Spectroscopy of Turbid Materials," *Applied Spectroscopy*, No. 50 (1996) p. 1066.

Service, F. John et al., Dermal Interstitial Glucose as an Indicator of Ambient Glycemia, *Diabetes Care*, vol. 20, No. 9, Sep. 1997, 9 pages.

Shroder, Robert, (Internet Article) MicroPac Forum Presentation, Current performance results, May 11, 2000.

Sjoblom, J. et al., "An Evaluation of Orthogonal Signal correction Applied to Calibration Transfer of Near Infrared Spectra," *Chemom & Intell Lab. Sys.*, vol. 44 (1998) p. 229.

Steel, W.H., "Interferometers for Fourier Spectroscopy," Aspen International Conference on Fourier Spectroscopy, (1970) pp. 43–53.

Sternberg R.S. et al., "A New Type of Michelson Interference Spectrometer," *Sci. Instrum.*, vol. 41 (1964) pp. 225–226.

Stork, Chris L. et al., "Weighting Schemes for Updating Regression Models—a Theoretical Approach," *Chemometrics and Intelligent Laboratory Systems 48*, (1999) pp. 151–166.

Sum, Stephen T. et al., "Standardization of Fiber–Optic Probes for Near–Infrared Multivariate Calibrations," *Applied Spectroscopy*, vol. 52, No. 6 (1998) pp. 869–877.

Swierenga, H. et al., "Comparison of Two Different Approaches Toward Model Transferability in NIR Spectroscopy," *Applied Spectroscopy*, vol. 52, No. 1 (1998) pp. 7–16.

Swierenga, H. et al., "Improvement of PLS Model Transferability by Robust Wavelength Selection," *Chemometrics and Intelligent Laboratory Systems*, vol. 41 (1998) pp. 237–248.

Swierenga, H. et al., "Strategy for Constructing Robust Multivariate Calibration Models," *Chemometrics and Intelligent Laboratory Systems*, vol. 49, (1999) pp. 1–17.

Teijido, J.M. et al., "Design of a Non–conventional Illumination System Using a Scattering Light Pipe," *SPIE*, Vo. 2774 (1996) pp. 747–756.

Teijido, J.M. et al., "Illumination Light Pipe Using Micro–Optics as Diffuser," *SPIE*, vol. 2951 (1996) pp. 146–155.

Thomas, Edward V. et al., "Development of Robust Multivariate Calibration Models," *Technometrics*, vol. 42, No. 2, May 2000, pp. 168–177.

Tipler, Paul A., *Physics, Second Edition*, Worth Publishers, Inc., Chapter 34, Section 34–2, Nov. 1983, pp. 901–908.

Wang, Y–D. et al., "Calibration Transfer and Measurement Stability of Near–Infrared Spectrometers," *Appl. Spectros.*, vol. 46, No. 5 (1992) pp. 764–771.

Wang, Y–D. et al., "Improvement of Multivariate Calibration Through Instrument Standardization," *Anal. Chem.*, vol. 64 (1992) pp. 562–564.

Wang, Z., "Additive Background Correction in Multivariate Instrument Standardization," *Anal. Chem.*, vol. 67 (1995) pp. 2379–2385.

Ward, Kenneth J. et al., "Post–Prandial Blood Glucose Determination by Quantitative Mid–Infrared Spectroscopy, *A Spectroscopy*," vol. 46, No. 6 (1992) pp. 959–965.

Webb, Paul, "Temperatures of Skin, Subcutaneous Tissue, Muscle and Core in Resting Men in Cold, Comfortable and Hot Conditions," *European Journal of Applied Physiology*, vol. 64 (1992) pp. 471–476.

Whitehead, L.A. et al., "High–efficiency Prism Light Guides with Confocal Parabolic Cross Sections," *Applied Optics*, vol. 37, No. 22 (1998) pp. 5227–5233.

* cited by examiner

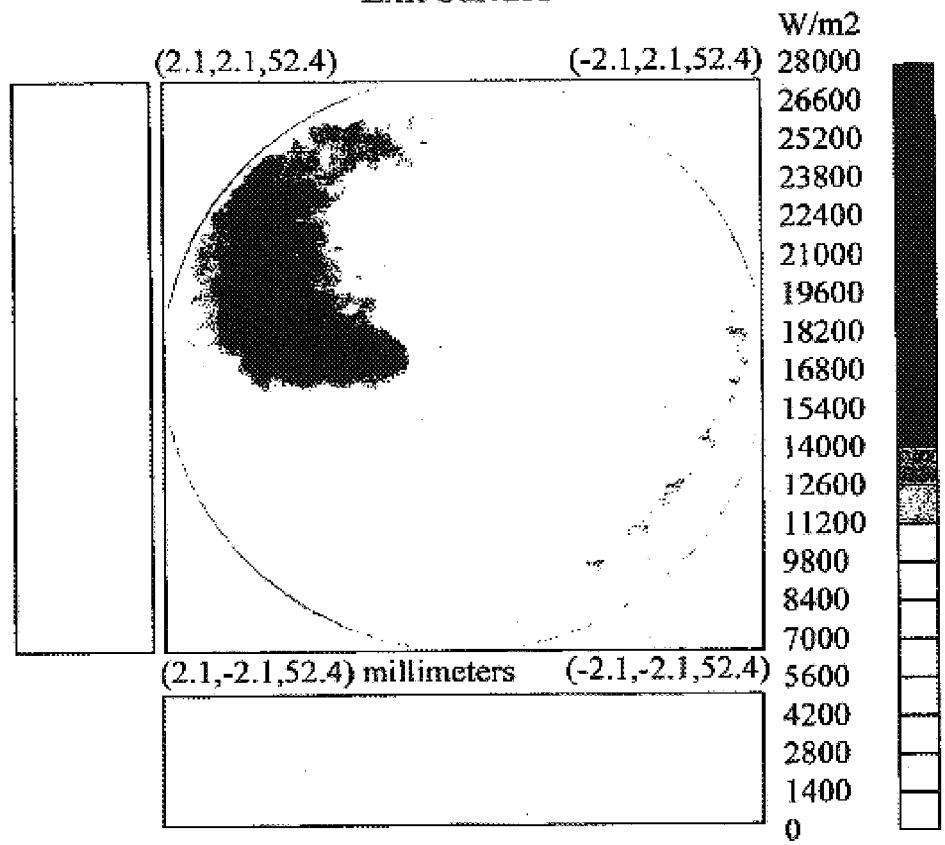

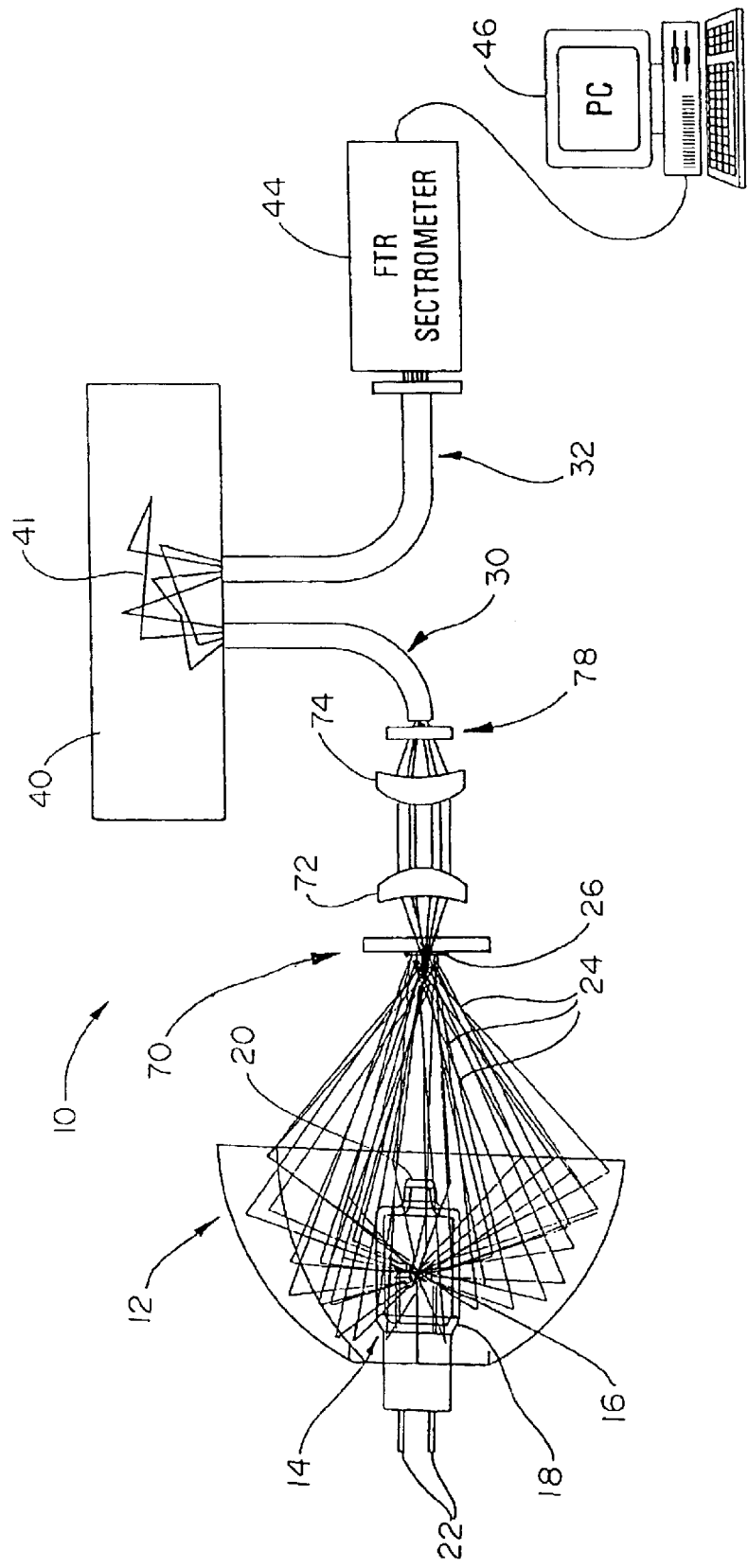

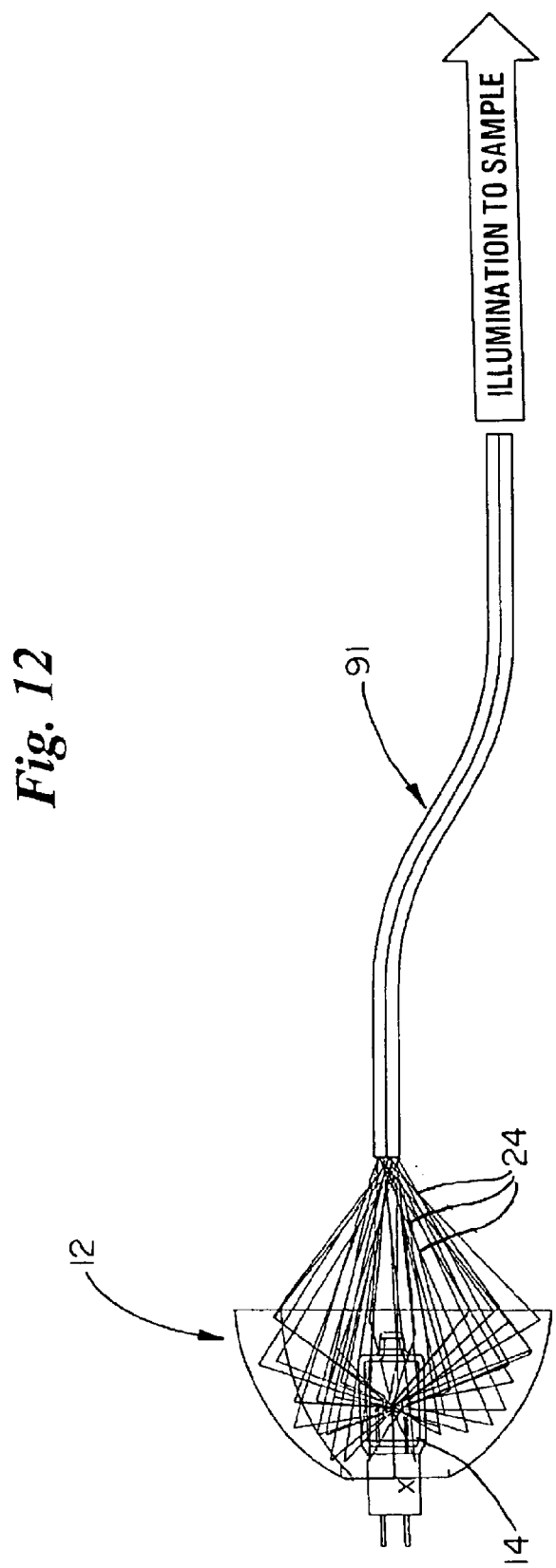

Irradiance Min:0.00032399 W/m2, Max:19613 W/m2,
Normalized Flux:0.17434 114383 Incident Rays Irradiance Min:5.3024e-005 W/m2, Max:14361 W/m2,
Normalized Flux:0.12676 86490 Incident Rays Data covers +/- 40.000 degrees from Normal Data covers +/- 40.000 degrees from Normal Total – Irradiance Map for Incident Flux
Exit Surface Irradiance Min:0.249e-005 W/m2, Max:3265.5 W/m2,
Normalized Flux:0.018369 16288 Incident Rays Polar Iso-Candela Plot
Using incident rays on Exit Surface Data covers +/- 50.000 degrees from Normal
Collected Flux: 7.1784W, 16288 Rays
Min:2.1681e-009 W/sr, Max:39.106W/sr,
Total Flux: 7.1784W

US 6,862,091 B2

ILLUMINATION DEVICE AND METHOD FOR SPECTROSCOPIC ANALYSIS

RELATED APPLICATION

This application is related to U.S. patent application Ser. No. 09/832,585, entitled "System for Non-Invasive Measurement of Glucose in Humans"; U.S. patent application Ser. No. 09/832,608, entitled "Optically Similar Reference Samples and Related Methods for Multivariate Calibration Models Used in Optical Spectroscopy"; and U.S. patent application Ser. No. 09/832,631, entitled "Encoded Variable Filter Spectrometer", all filed on the same date herewith and assigned to the assignee of the present application. The disclosure of each of these related applications is hereby incorporated by reference.

TECHNICAL FIELD

The present invention generally relates to the field of diagnostic spectroscopy, and more specifically, to an improved illumination device for obtaining spectral information and determining physical properties of a tissue sample. The present invention provides for an illumination device including an element or elements that spatially and angularly homogenize radiation for illuminating a sample under analysis while maintaining a high signal-to-noise ratio.

BACKGROUND OF THE INVENTION

Spectral data arising from spectroscopic analysis provides practitioners with a wealth of detailed information about the identity, structure, and concentration of samples or constituents of samples. Spectral data derives from the detected and recorded energy change of a molecule through the emission or absorption of a photon.

In particular, practitioners focus upon a molecule's vibration. Atoms within a molecular species vibrate back and forth about an average distance. Absorption of light by an atom at an appropriate energy causes the atoms to become excited, elevating the atom to a higher vibration level. The excitation of the atoms to an excited state occurs only at certain discrete energy levels, which are characteristic for that particular molecule. Infrared absorption spectroscopy is particularly useful for performing this type of analysis. In absorption spectroscopy, the net absorption of incident radiation at various wavelengths is measured.

Radiation passing through a sample is attenuated depending upon the pathlength traveled by the radiation and the strength of absorptions at various individual wavelengths for constituents within that particular sample. Recording and mapping the relative strength of the absorption versus wavelength results in a unique absorption "fingerprint" for that particular sample.

Cataloging infrared absorption permits practitioners to readily identify unknown samples by cross-referencing their samples of interest with a cataloged database. Matches between the spectrum of a compound of known structure and that of an unknown structure unambiguously identify the latter. This is an illustration of the qualitative aspects of spectrometry. Similarly, spectrometry also aids practitioners in quantitative analysis of known compounds. In illustration, calibration of a spectrophotometer on a known analyte of known concentration permits the accurate measurement of the same analyte of unknown concentration.

Most absorption spectroscopic instruments consist of five components: 1) a source of radiant energy, 2) a wavelength selector that permits the isolation of a restricted wavelength region (i.e., a monochromator), 3) one or more sample containers, 4) a radiation detector which converts radiant energy to a measurable signal (usually electrical), and 5) a signal processor and readout.

One application area for multivariate quantitative spectroscopy is the measurement of tissue attributes or analytes noninvasively. A specific application is the measurement of glucose noninvasively for subjects with diabetes. This application is difficult due to the complexity of the tissue, a turbid media, and the small size of the glucose signal. For the measurement of analytes with small concentrations in turbid media, care must be taken to minimize spectroscopic variances that overlap with the absorbance spectrum of the analyte of interest. Spectroscopic interferences are those spectroscopic variances unrelated to the analyte of interest but present during calibration development or during the measurement. Spectral interferences that overlap with or appear similar to the analyte of interest are especially bothersome. Spectroscopic interferences or variances can be classified into four general groups: 1) measurement variance; 2) physiological variance; 3) instrument variance; and 4) sampling variance. Measurement variance is the variance inherent in the data acquisition process. Johnson noise, shot noise, electronic noise and quantization errors are all types of measurement variance or measurement noise. Physiological variances are typically defined by the chemical or structural complexity of the sample. In the preferred application of noninvasive glucose measurement, significant physiological variance is present due to the complex nature of skin. Instrument variance is any variance due to changes in the performance of the optical measurement system. Changes in the performance of the illumination system would be a type of instrument variation. Sampling variance is due to errors associated with optical interfacing to the sample of interest. An objective in designing optical measurement instrumentation is to maximize the net analyte signal. The net analyte signal is that portion of the pure component that is orthogonal to the other sources of spectroscopic variation. The pure component spectrum is the absorbance spectrum of the analyte of interest in the absence of other absorbing species. See, for example, "Net Analyte Signal Calculation in Multivariate Calibration," by Avraham Lorber, *Analytical Chemistry Analytical Chemistry,* Vol. 69, No. 8, Apr. 15, 1997.

Practitioners skilled in the art have designed measurement systems that minimize measurement variances associated with the recoding of optical information. In particular, Johnson noise and electronic noise may be minimized through effective instrument design. Additionally, the operation of modem A/D converters using 16-bit or higher digitization can substantially reduce the effect of digitization error. Thus, through instrument design, shot noise can be isolated as the predominant noise source in most modem spectrophotometer systems working in the near-infrared region of the electromagnetic spectra.

Physiological variances are due to compositional or structural differences that vary in the biological sample but are unrelated to the analyte or attribute of interest. Significant complexity is present when the sample of interest is tissue. Biological tissue is commonly characterized as a turbid medium. Turbid media generally fail to permit any single ray of light from following an undisturbed pathway through the medium. In effect, turbid media are non-deterministic. That is, a light ray that enters a turbid medium may undergo several scattering events before finally exiting the medium. When many light rays are directed into a turbid medium, each of the exiting rays collected at any given point will have traveled a different distance through the medium. As a result, a spectrum from a turbid medium source is determined not only by type and concentration of the molecular species in the medium, but also by the scattering characteristics of the media that influence the path distribution of the light traveling through the medium.

Instrumentation variances are spectroscopic variations introduced by the optical instrumentation. Instrumentation variances can result in statistically relevant errors. A recognized instrumentation variant is the illumination system. The illumination system is the entire optical system from the source of radiation to the sample or the spectrometer. Common components of an illumination system include the emitter or radiation source, reflective optics, refractive optics, focusing lenses, collimating lenses, filters, relay optics or optical fibers. A radiation source for absorption measurements must generate a beam with sufficient power in the wavelength region of interest to permit ready detection and measurement. In addition, the radiation source must also provide a reproducible output.

The most common source of near-infrared radiation is the tungsten-filament lamp. The energy distribution of this source approximates that of a blackbody, and is thus temperature dependent. In most absorption spectrophotometers, the operating filament temperature is about 2900 K; therefore, the bulk of the energy is emitted in the infrared region. A tungsten-filament lamp is useful for the wavelength regions between 320 and 2500 nm, the lower limit imposed by absorption by the glass envelope that houses the filament.

A change in the lamp, adjustment to the lamp or changes within a lamp may affect the resulting spectral data produced by the illumination system. The following are four examples of common variants associated with the illumination system. The replacement of the lamp can result in significant spectroscopic variance when using existing illumination systems. The spectroscopic variance can be due to manufacturing inconsistencies between lamp filaments. Known manufacturing inconsistencies include differences in filament shape, differences in filament location, and differences in filament material. A second source of spectroscopic variance can be caused by rotation or tilting of the same lamp in the lamp housing. A third known source of variance is due to differences in the glass envelope surrounding the filament. Specifically the glass envelope "nipple" can create shadowing and cause inhomogenous illumination of the sample or sampling apparatus. Finally, the lamp may change over time due to vibration or sagging of the filament. Such changes can cause intensity and temperature variations along the filament length. With current illumination systems, the above changes can cause spectroscopic variances. In maximizing overall system performance, it is desirable to minimize spectroscopic variances unrelated to the analyte of interest. Illumination system variances include all variances due to different lamps, due to lamp aging, due to placement of the lamp in the instrument or any other variance that results due to a change in lamp performance or how the radiation source interacts with the remainder of the optical system. With current illumination systems, radiation emitter variances can cause spectroscopic variances. Illumination system variances unrelated to either the sample of interest or the analyte being measured can result in prediction errors and necessitate the need for re-calibration. Re-calibration is generally undesirable due to increased expense and down time on the instrument. Thus, in maximizing overall system performance, it is desirable to minimize illumination system variances.

To achieve increased accuracy in the measurement of analyte concentration, a practitioner of the art must, among other things, strive either to eliminate interferents or to construct a chemometric model that is sensitive to the differences between interferents and the desired analyte. Fortunately, spectral changes due to interferents are seldom identical to spectral changes due to changes in analyte concentration. Thus, the ability of a chemometric model to distinguish between an interferent and a particular analyte is typically improved by increasing the size of the calibration set.

In the presence of significant spectroscopic variance and when the degree of overlap (spectral similarity) between the analyte and the interferent is high, the number of model "factors" required to adequately distinguish between the interferent and the analyte will be large (the model complexity will be high). Unfortunately, in the presence of measurement noise, there are practical limitations associated with the number of model factors that can be used effectively. The ability of the practitioner to improve the sensitivity of the model to differences between the interferent and the analyte by increasing the size of the calibration model will be limited by the presence of noise in the measurement which limits the ability to distinguish between the spectra of the interferent and the analyte. In systems where there is a high degree of overlap between interferents and the particular analyte of interest, the practitioner must strive to reduce the amount of spectroscopic interference, specifically instrument variance to the greatest degree possible.

In spectrophotometer instruments where shot noise is the predominant source of measurement noise in the instrument, the signal-to-noise ratio (SNR) for the instrument is directly proportional to the square root of the flux ($\Phi$) on the photodetector. Thus, for these instruments, the SNR can be improved by maximizing the amount of light incident on the detector. For measurements on biological tissue, however, the practitioner cannot increase the flux on the detector without limit. Increasing the flux on the detector generally necessitates increasing the incidance on the tissue. The increased incidence on the tissue may result in thermal damage to the tissue. Therefore, there are practical limits on how much light can be incident on the tissue.

Fourier-transform infrared (FTIR) spectrophotometers are a class of spectrometer that can be operated where shot noise is the predominant measurement noise. FTIR spectrophotometers offer the advantages of unusually high sensitivity, resolution, and speed of data acquisition. Generally, data from an entire spectrum can be obtained in one second or less. The heart of a Fourier transform spectrophotometer is an interferometer, which is a device for analyzing the frequencies present in a composite signal and the relative strength of the signal at such frequencies.

Vast improvement in spectroscopic optical analysis, particularly quantitative determination of analytes in biological tissue, can be achieved if the above-identified problems are minimized or eliminated. In particular, if illumination system variances could be eliminated or substantially reduced as an interferent the complexity (number of model factors) of the model may be reduced and the net analyte signal increased. This would result in reduced instrument variance and increase the predictive accuracy of a model, particularly in situations where the interferent has substantial overlap with the analyte of interest in the tissue. It is further important that a system which eliminates or reduces instrument interferents also minimizes measurement noise. The present invention is directed to apparatus and methods which eliminate or reduce changes in the light source or illumination system as an interferent while maintaining high signal-to-noise ratio.

SUMMARY OF THE INVENTION

The present invention provides an apparatus and method for spatially and angularly homogenizing radiation emitted by a radiant source for use in illuminating a sample or sampling apparatus for spectroscopic optical analysis. More specifically, the present invention provides components for spatially and angularly homogenizing radiation emitted by a radiant source which is to be used to illuminate a sample under analysis that overcomes expected variances particular to that radiant source and its placement and use within an optical system. Further, the present invention provides an apparatus and method for improving signal-to-noise ratio by filtering selected wavelengths prior to contact with the sample.

The reduction of the illumination source as an instrument variance or interferent has been found to greatly improve the ability to build an optical system and model which can accurately predict small analyte concentrations in turbid media such as tissue. The present invention provides this illumination stability not by use of a new radiation source, but by modifying the output beam prior to sample or sampler illumination to minimize spectroscopic variances due to the illumination system.

The present invention relates to an apparatus for minimizing spectroscopic variances due to radiation emitter differences by use of an illumination system that utilizes both angular and spatial homogenization. Angular homogenization is any process that takes an arbitrary angular distribution, or intensity (W/sr), of emitted radiation, and creates a more uniform angular distribution. Spatial homogenization is the process of creating a more uniform distribution of irradiance ($W/m^2$) across an output or exit face.

A standard lamp produces a non-uniform irradiance distribution due to the physical structure of the lamp filament. Thus, radiation emitter differences (e.g., a different lamp) will result in different non-uniform irradiance distributions. These differences in irradiance distribution between the lamps can translate into spectroscopic differences. Thus, an objective of the invention is to take different irradiance distributions due to emitter differences and create similar or ideally the same irradiance distribution. A preferred method of creating similar irradiance distributions is to create a uniform irradiance distribution.

Differences in the radiation emitter will also result in differences in angular distribution. As above, an objective of this invention is to create an illumination system where radiation emitter differences do not affect the angular distribution observed by the sample or at the input to the spectrometer. One mechanism is to create a uniform angular distribution. An ideal angular homogenizer would uniformly distribute the light over a sphere (4 pi sr) regardless of the angular distribution from the emitter. An ideal reflective angular homogenizer would uniformly distribute light over a hemisphere (2 pi sr). Due to the fact that other optical components in the system must collect light within a defined numerical aperture, ideal diffusers are typically very inefficient. Thus, the instrument designer must weigh the benefits of angular homogenization with loss in optical efficiency. Regardless of the specific embodiment, angular homogenization is a critical component in the realization of an illumination system that has reduced sensitivity to emitter differences.

The present invention provides a system for producing spatially and angularly homogenized light from an irregular emitter and using the homogenized light for spectral analysis. The resulting homogenized radiation illuminates the sample or sampler in a consistent and reproducible form, thus allowing for accurate and dependable molecular absorbance measurements.

An additional benefit of the current invention is spectral or "color" homogenization. A typical quartz tungsten halogen bulb emits blackbody radiation in a fashion that can be described by Planck's radiation law. This emitted radiation is a function of the filament's color temperature, a calorimetric concept related to the apparent visual color of a source. The color temperature of the filament is not constant across the length of the filament and therefore the spectral radiation will not be constant. Thus, color temperature variations across the filament will result in spectral differences across the filament length. These spectral differences due to color temperature variations or other filament differences can be different between emitters and can change over time. These differences in color temperature or spectral distribution between lamps can translate into spectroscopic differences. Thus, an additional objective of the invention is to take different spectral distribution due to emitter differences and create similar or ideally the same spectral distribution. A preferred method of creating similar spectral distribution is to create an output that has uniform spectral content.

The usefulness of the present invention is best illustrated by the familiar occurrence of routine maintenance to a spectrometer. It is common for radiant light sources to burn out. Although application dependent, the replacement of the light source has resulted in prediction errors and has necessitated recalibration of the spectrometer to the new light source. In systems intended for commercial use by unskilled operators, recalibration is not desired. With the present invention, however, differences in the light source are irrelevant and proper performance of the optical measurement system is maintained. Regardless of the spatial and angular characteristics of the radiation entering the light homogenizer, the use of the present invention will result in radiation incident on the sample which always remains generally spatially and angularly homogenized. Thus, a light source change will not detract from the accuracy and dependability of molecular absorbance measurements using the present invention.

The present invention farther specifies a system for providing illumination to biological tissue samples. More specifically, the system is particularly suited for spectroscopic illumination of biological tissues for determining and quantifying the concentration of specific analytes within or other characteristics of the tissue. The present invention enables a practitioner to construct and operate an illumination device that permits measurements with a high signal-to-noise ratio (SNR) while minimizing thermal damage to biological tissue. With a high SNR, chemometric models may be developed for differentiating between a particular analyte and interferents similar to that analyte. The present invention allows for infrared spectroscopic analysis of turbid medias by satisfying the following conditions:

(1) The radiation emitted by the present invention contains wavelengths useful for measuring the analyte of interest. The radiation may be continuous versus wavelength, in locally continuous bands, or selected to particular wavelengths. The result is radiation that encompasses the wavelength regions that contain the near-infrared spectral "fingerprint" for the analyte of interest. For FTIR spectroscopy of glucose, this wavelength region spans approximately from 1.4 to 2.5 $\mu$m.

(2) The radiation emitted by the present invention is of sufficiently high spectral radiance ($L_\lambda$) to provide a high signal-to-noise ratio in the spectral fingerprint region for the analyte of interest. In FTIR spectroscopy of glucose, for example, the radiation from a halogen lamp concentrated with one or more optical elements, such as lenses and or mirrors, will provide a spectral radiance that satisfies this condition.

(3) The spectral incidance ($E_\lambda$) on the tissue is low enough to avoid burning biological tissue, or otherwise (discomforting) subjects. This may include the use of spectral filters to reduce or eliminate radiation that is outside the fingerprint region, and to selectively suppress certain wavelength bands that lie within the fingerprint region. Spectral filtering may be achieved by absorptive, diffractive, or interference means (absorption filters, gratings or prisms, or multilayer dielectric filters).

(4) The spectral radiance ($L_\lambda$) is generally invariant when subjected to changes in the spectral exitance ($M_\lambda$) of the emitter. Reasonably expected changes in the spectral exitance are those due to rotation and/or small translation of the emitter, or replacement of the emitter with another emitter of the same general construction.

By satisfying the above conditions, the present invention eliminates the need for recalibration due to illumination variability (bulb changes, source rotation or movement) or development of a chemometric model that compensates for such changes. Simple maintenance such as replacing the light source would no longer necessitate recalibration or the development of chemometric models sensitive to light source changes. Furthermore, rotations and translations of the light source caused by jolts, bumps, and other similar vibrations would have minimal effects on the accuracy of a test.

BRIEF DESCRIPTION OF THE DRAWINGS

FIG. 3b is an incidance plot showing the changes in spatial distribution of emitted radiation after a 90-degree rotation of the filament used in producing the incidance plot of FIG. 3a;

FIG. 3c is an incidance plot showing the changes in spatial distribution of emitted radiation after a one-millimeter vertical translation of the filament used in producing the incidance plot of FIG. 3a;

FIG. 4b is an intensity plot showing the changes in angular distribution of emitted radiation after a 90-degree rotation of the filament used in producing the intensity plot of FIG. 4a;

FIG. 4c is an intensity plot showing the changes in angular distribution of emitted radiation after a one-millimeter vertical translation of the filament used in producing the intensity plot of FIG. 4a;

FIG. 8 is a diagrammed view of a system used for cross-validation analysis for baseline system performance using a tissue phantom for the sample source;

FIG. 12 is a plan view of a ray trace showing radiation focused by an elliptical reflector into and through a light pipe of the present invention;

FIG. 13b is an incidance plot showing the changes in spatial distribution of emitted radiation after a 90-degree rotation of the filament used in producing the incidance plot of FIG. 13a;

FIG. 13c is an incidance plot showing the changes in spatial distribution of emitted radiation after a one-millimeter vertical translation of the filament used in producing the incidance plot of FIG. 13a;

FIG. 14b is an intensity plot showing the changes in angular distribution of emitted radiation after a 90-degree rotation of the filament used in producing the intensity plot of FIG. 14a;

FIG. 14c is an intensity plot showing the changes in angular distribution of emitted radiation after a one-millimeter vertical translation of the filament used in producing the intensity plot of FIG. 14a;

DERAILED DESCRIPTION OF THE PREFERRED EMBODIMENTS

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. Those skilled in the art will recognize that many of the examples provided have suitable alternatives that may be utilized.

Figure 1:
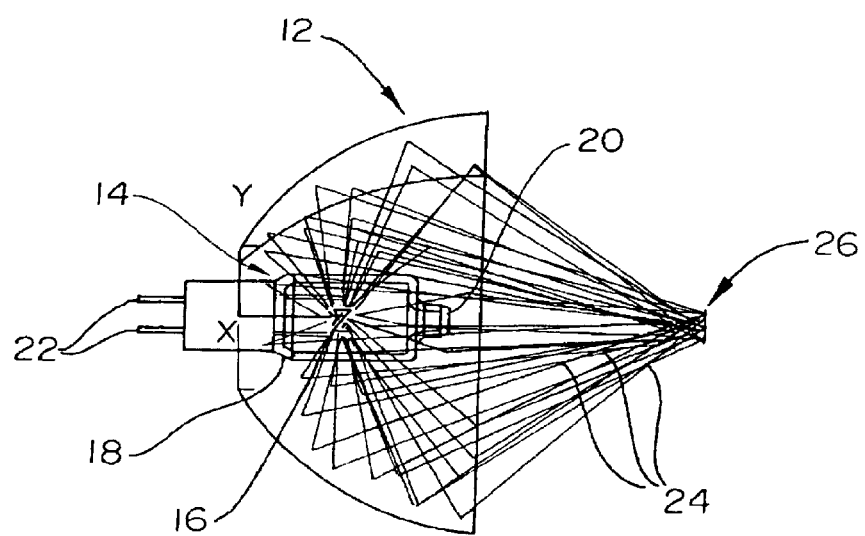
FIG. 1 is a detailed perspective view of an infrared radiation source lamp known in the art.

FIG. 1 shows a plan view of a near infrared radiation source lamp 14 known in the art. The appearance of a radiant source lamp 14 closely resembles that of a traditional residential light bulb. Traditional spectrophotometer lamps consist of a filament 16 housed within a transparent envelope 18, or the like. The transparent envelope 18 is either comprised of a silicate glass, fused silica or quartz material. The material used for the glass envelope 18 is dependent upon the wavelength regions being surveyed on the electromagnetic spectrum.

The envelope 18 traditionally is cylindrical or oval in shape. The lamp 14 of FIG. 1 specifically is of a closed-end cylindrical variety. The closed-end portion of the cylinder has a nipple 20 positioned near the center of the cylinder's closed-end base. The nipple 20 formation is a result of manufacturing and functionally has no beneficial purpose. On the other hand, the nipple 20, as will be discussed in detail later, affects the emission of radiant energy.

Filament 16, and subsequently lamp choice, is wavelength dependent. Operating in the infrared and near infrared regions of the electromagnetic spectrum requires a radiation source filament 16 applicable to those spectral regions. Several continuous radiation sources including tungsten-halogen lamps, tungsten lamps, nerst glowers, nichrome wires and globars are suitable for infrared molecular absorption spectroscopy. The desired filament is manufactured so as to place the filament 16 within the open end of the glass envelope 18 and securely fastened thereto. Wires or leads 22 emerge from the filament 16 and out of the glass envelope 18 attaching the filament 16 to an energy source (not shown). Because the energy output of a filament 16 generally varies approximately with the operating voltage, close voltage control is essential. For this reason, most lamps 14 are attached through the wires or leads 22 to a constant-voltage transformer or electronic voltage regulator.

Tungsten-halogen lamps are a preferred radiation source for performing infrared molecular absorption spectroscopy. Tungsten-halogen lamps are particularly useful in modern spectroscopic instruments because of their extended wavelength range, greater intensity, and longer life. Specifically, tungsten-halogen lamps emit wavelengths within the region of 240–2500 nm, covering portions of the ultraviolet, visible, and near-infrared spectral regions of the electromagnetic spectrum. Thus, a tungsten-halogen lamp is a preferred source of radiant energy for the present invention. Any suitable lamp source operating within the infrared region of the electromagnetic spectrum, however, may be used in conjunction with the present invention.

The basic illumination source depicted in FIG. 1 further includes an elliptical reflector 12 which focuses emitted light from bulb 14 to a reflector focus 26. Representative rays 24 are depicted to show the function of the reflector 12. The relationship between the radiant source emitter 14 and the elliptical reflector 12 was used in the subsequently disclosed experiments.

Figure 2:
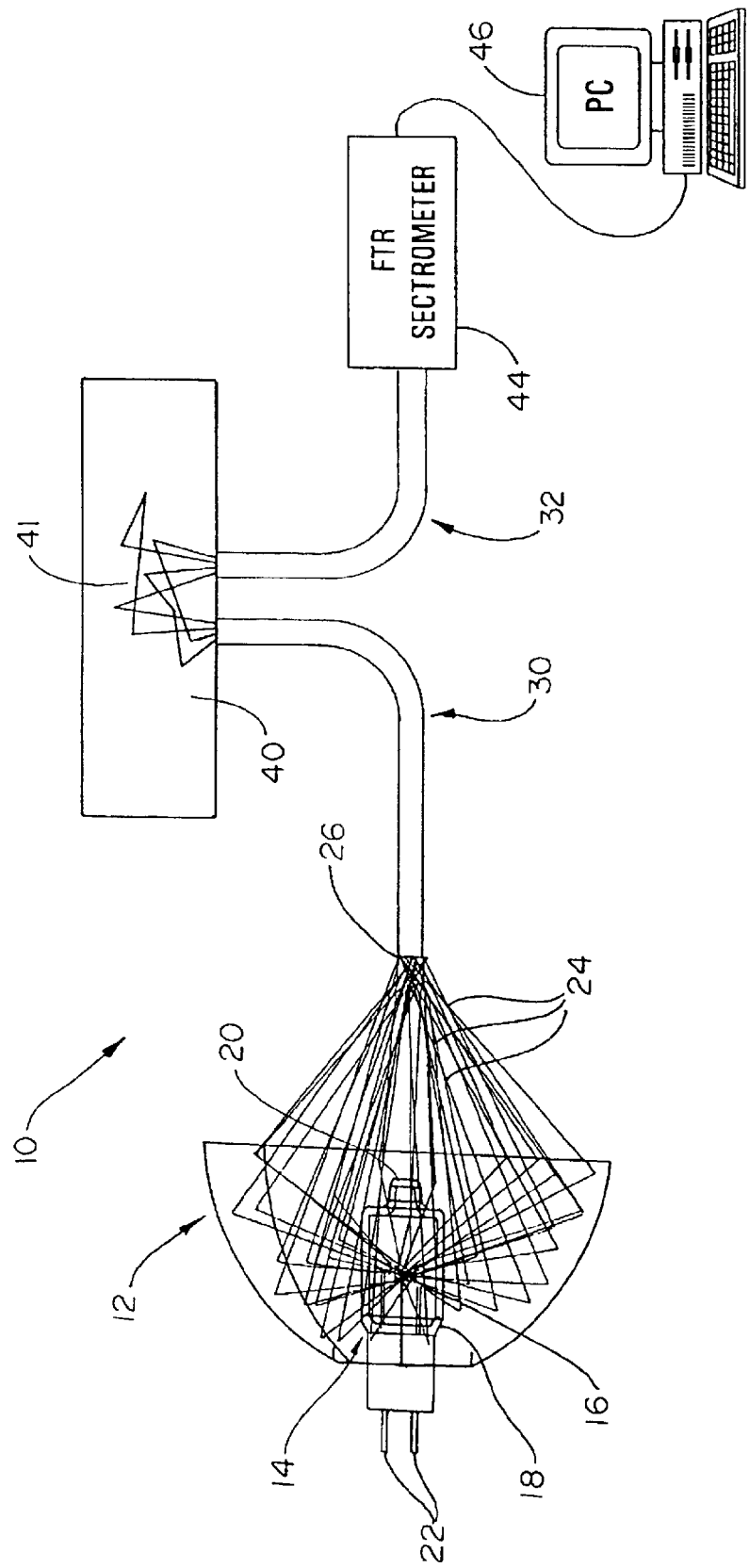
FIG. 2 is a diagrammed view of a system for measuring the concentration of an analyte within biological tissue.

Referring now to FIG. 2, a diagrammed view of a system 10 for measuring the concentration of an analyte within biological tissue is depicted. The system 10 depicted is simplified by illustrating certain specific elements within a far more elaborate spectroscopic system. The elements depicted in FIG. 2, however, are common to spectroscopic systems, and therefore, require some identification.

An elliptical reflector 12 known in the art is shown. At the center of the elliptical reflector 12 is radiation source lamp 14. The radiation source lamp 14 is depicted as having a filament 16, a glass envelope 18 with nipple 20 housing the filament 16, and a pair of leads 22 extending from the end of the lamp. Surrounding a portion of the lamp 14 is the body of the reflector 12. The elliptical reflector 12 functions to concentrate emitted radiation rays 24 (shown as a ray trace) from the radiation source lamp 14 onto the reflector's focal point 26. In order to maximize reflectance, the elliptical reflector 12 is generally made from a highly polished metal. Although FIG. 2 specifically illustrates an elliptical reflector, other shapes suitable for focusing radiant energy are also within the scope of the invention.

FIG. 2 depicts two fiber optic bundles, an illumination fiber bundle 30 and a collection fiber bundle 32. Fiber optic bundles 30 and 32 are extremely versatile because they are capable of channeling harnessed radiation between elements without noticeable reduction in the intensity of that harnessed radiation.

At the reflector's focal point 26 is an opening to the illumination fiber bundle 30. The illumination fiber bundle 30 collects the radiation emitted 24 by the lamp 14 and channels the radiation through the bundle system. At the output end of the illumination fiber bundle 30 is another opening that then directs the harnessed radiation onto a sample 40, such as human tissue on a person's forearm. The second fiber optic bundle, the collection fiber bundle 32, is positioned proximate to the sample 40 to again collect radiation, however, here the radiation is diffusely reflected from the sample 40.

Diffusely reflected radiation is that radiation reflected from within the sample 40. Diffusely reflected radiation does not generally follow a uniform pattern. Ray tracing of the diffusely reflected radiation within the sample 40 as shown in FIG. 2 illustrates possible pathways of radiation entering, and subsequently reflecting out of, the sample 40.

The sample 40 is the subject of the spectroscopic analysis. Qualitative and quantitative measurements of specific analytes within the sample 40 may be conducted by measuring absorption of introduced radiation from the emitter 14. In a preferred embodiment, the sample 40 is biological tissue. More specifically, the sample 40 is an appendage, or a portion thereof, of the human anatomy. For example, the sample 40 may be a forearm or a finger, to list a few.

The collection fiber bundle 32 then channels the diffusely reflected radiation from the sample 40 to a spectrophotometer 44 where the radiation is detected by converting the recaptured radiant energy into a measurable signal. In a preferred embodiment of the invention, a Fourier transfer infrared (FTIR) spectrophotometer is utilized to analyze the diffusely reflected radiant energy emitted by the sample 40. The usually electrical signal is then transferred to a signal processor. Processing of the signal is generally accomplished using a computer or other data processing means 46 designed for such processing. The outcome of the processing is then transcribed to a readout, allowing practitioners to study the results of the analysis.

As described in detail above, in spectrophotometer instruments where shot noise predominates the system, as is in the system depicted in FIG. 2, the signal-to-noise ratio (SNR) for the system is directly proportional to the square root of the flux ($\Phi$) on the photodetector. The SNR for the system, however, can be improved by maximizing the amount of radiation incident on the detector. Increasing the flux on the detector generally necessitates increasing the incidance, and thus, may cause thermal damage on the sampled biological tissue 40. To illustrate this tissue-heating problem, experiments were conducted utilizing the system illustrated in FIG. 2. For the experiment, the sample 40 used was the forearm of a living human subject and the analyte to be measured was glucose.

The radiation source lamp 14 was connected to a variable current source that permitted the lamp 14 to increase output up to a maximum of 40 watts. The output of the lamp would then be incrementally increased until the SNR was high enough to acquire accurate glucose measurements. As the lamp power was increased during the subsequent experimental trials, most of the subjects reported discomfort prior to reaching an acceptable SNR. The discomfort experienced by the subjects was due to a localized heating of their forearm by the illuminating radiation.

To further analyze the above-described phenomenon, a ray trace program was utilized to compare and contrast various illumination systems for spatial and angular homogeneity. TracePro V2.1, a commercially available non-sequential ray trace program, was used to generate realistic models of the radiation distributions from various illumination system configurations. The output from such modeling is depicted in FIGS. 3a–c, 4a–c, 13a–c and 14a–c. In order to understand the output of the modeled illumination, Table 1 correlates the specific radiometric terms to their corresponding symbols, definitions, and units.

TABLE 1

Definition of Radiometric Quantities

| Name | Symbol | Definition | Units |
|---|---|---|---|
| Energy | Q | — | Joules, J |
| Flux | $\Phi$ | $\frac{\partial Q}{\partial t}$ | Watts, W |

TABLE 1-continued

Definition of Radiometric Quantities

| Name | Symbol | Definition | Units |
|---|---|---|---|
| Exitance | M | $\frac{\partial \Phi}{\partial A_s}$ | W/m² |
| Incidance | E | $\frac{\partial \Phi}{\partial A_r}$ | W/m² |
| Radiance | L | $\frac{\partial \Phi}{\partial (A_s \cdot \cos\theta) \cdot \partial \Omega}$ | W/m²/sr |

With respect to Table 1, $\partial A_r$ and $\partial A_s$ refer to differential elements of area on the receiver and source, respectively. Additionally, $\theta$ refers to the angle between the line of sight from the observer to the source and the direction of the radiation 24. The associated spectral quantities are defined by differentiating the above general radiometric quantities with respect to wavelength, as depicted below:

$$M_\lambda \equiv \frac{\partial M}{\partial \lambda}, E_\lambda \equiv \frac{\partial E}{\partial \lambda}, \text{ and } L_\lambda \equiv \frac{\partial L}{\partial \lambda}$$

Figure 3A:
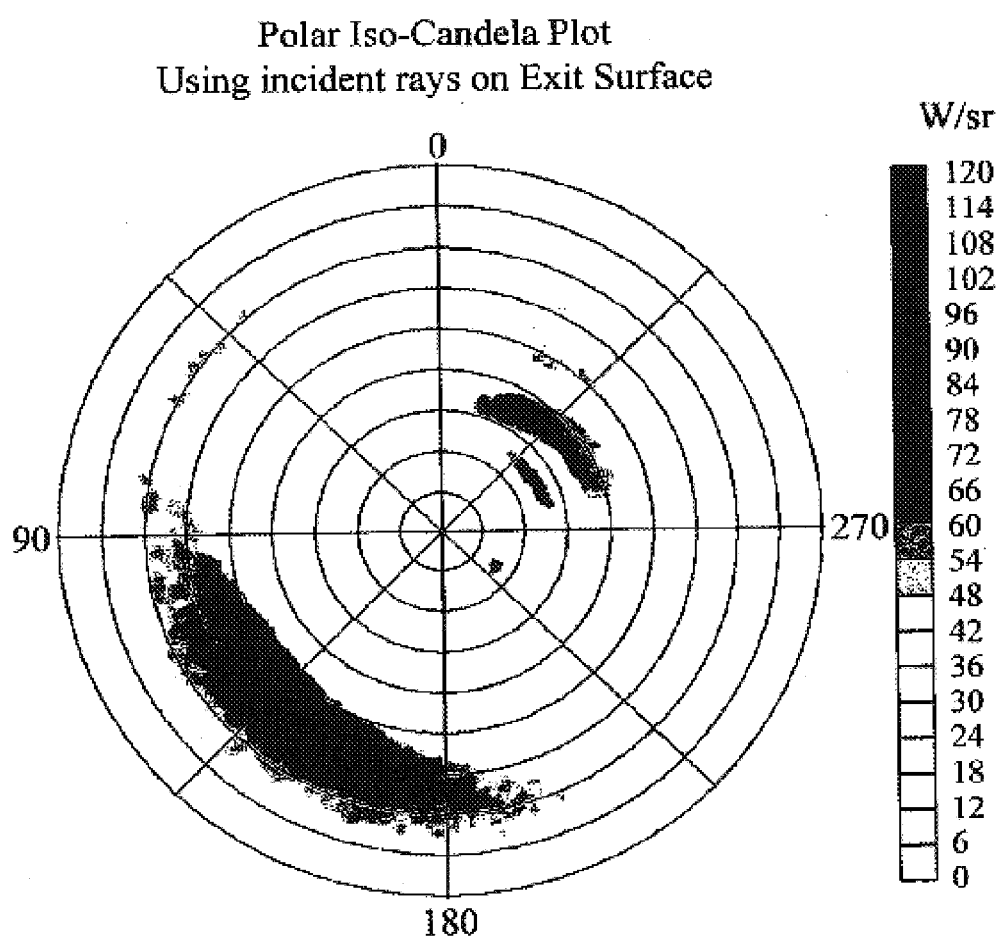
FIG. 3a is an incidance plot using a ray trace program simulating the spatial distribution of emitted radiation from an infrared spectrophotometer known in the art.
Figure 3C:
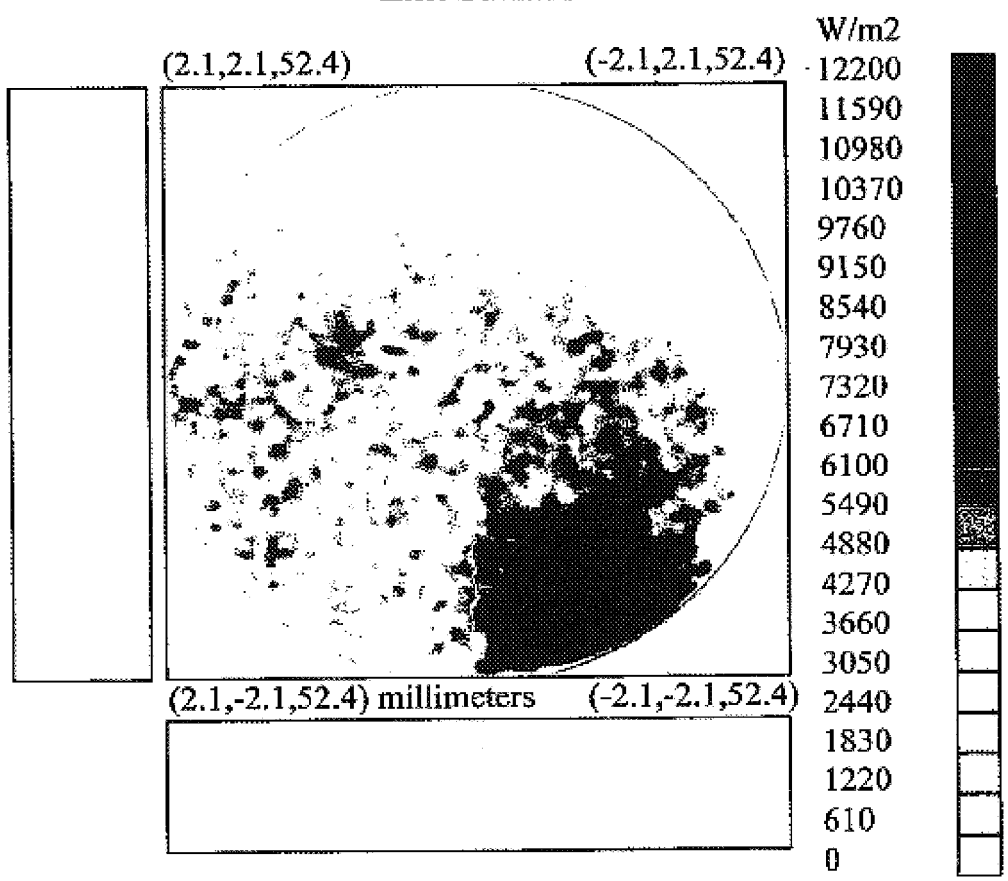

FIGS. 3a–c are plots of the incidance of emitted radiation 24 from the elliptical reflector 12 in FIG. 1. These plots have been generated using TracePro V2.1, a ray trace program simulating the spatial distribution of emitted radiation from the radiation source lamp 14. More specifically, the plots of incidance are representative of the spatial distribution of emitted radiation at the focus of the elliptical reflector 26 diagrammed in FIG. 1.

FIG. 3a shows a plot of incidance of emitted radiation 24 from a radiation source lamp 14. The resulting incidance plot is characterized by a substantial degree of spatial inhomogeneity. Spatial distribution of emitted radiation in particular areas of the plot is demonstrated to vary substantially throughout the incidance plot. In certain areas within the plot, the spatial distribution is greater than other areas within the same plot. The converse is also true. The spatial distribution of the emitted radiation is also illustrated to follow certain arc-like bands of greater or lesser incidance throughout the plot.

FIG. 3b shows a plot of incidance of the same radiation source lamp of FIG. 3a, but after a 90-degree rotation of the filament producing the incidance plot. Comparisons of the plots of FIGS. 3a and 3b show that areas of greater incidance in FIG. 3a are now areas of lesser incidance in FIG. 3b, and the inverse. FIG. 3c further depicts this spatial distribution disparity by showing the changes in spatial distribution when the filament 16 of the same radiation source lamp 14 of FIG. 3a undergoes a vertical translation of one millimeter. Again, the spatial distributions in FIG. 3c after the one-millimeter translation provide areas of greater incidance where there were originally none in FIG. 3a. These plots document that the spatial distribution of light at the focus of the standard light source is highly unstable with modest translations and/or rotations of the filament.

Similar to FIGS. 3(a–c), FIGS. 4(a–c) depict plots of the intensity of emitted radiation from the elliptical reflector in FIG. 1. These plots have also been generated using TracePro V2.1 to simulate the angular distribution of emitted radiation 24 from a radiation source emitter 14 known in the art. More specifically, the plots are representative of the angular distribution of radiation at the focus of the elliptical reflector 26 diagrammed in FIG. 1, i.e., the direction of the light rays at the focus of the elliptical reflector.

Figure 4A:
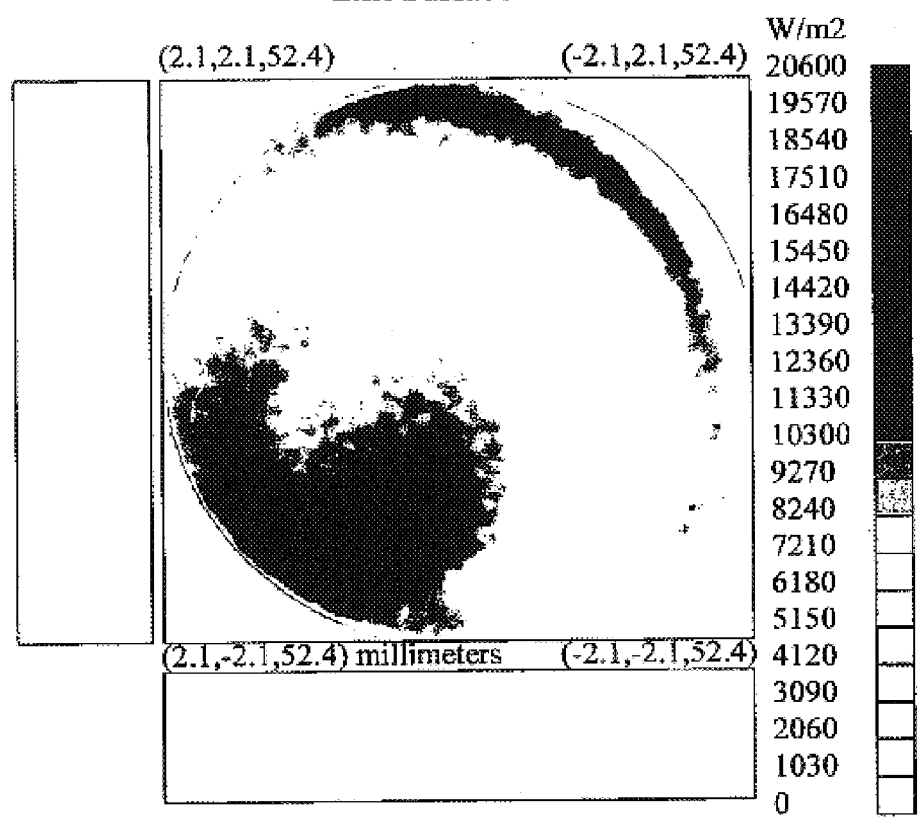
FIG. 4a is an intensity plot using a ray trace program simulating the angular distribution of emitted radiation from an infrared spectrophotometer known in the art.

FIG. 4a shows a plot of intensity of emitted radiation from a radiation source lamp 14. The resulting intensity plot from the standard radiation source is characterized by a substantial degree of angular inhomogeneity. Angular distributions in particular areas of the plot also vary dramatically within the same plot. For example, FIG. 4a illustrates a "hole" in the center of the intensity plot. The lack of irradiation intensity in this particular area is a result of a shadowing effect by the envelope nipple 20 on the end of a radiation source lamp 14.

Figure 4B:
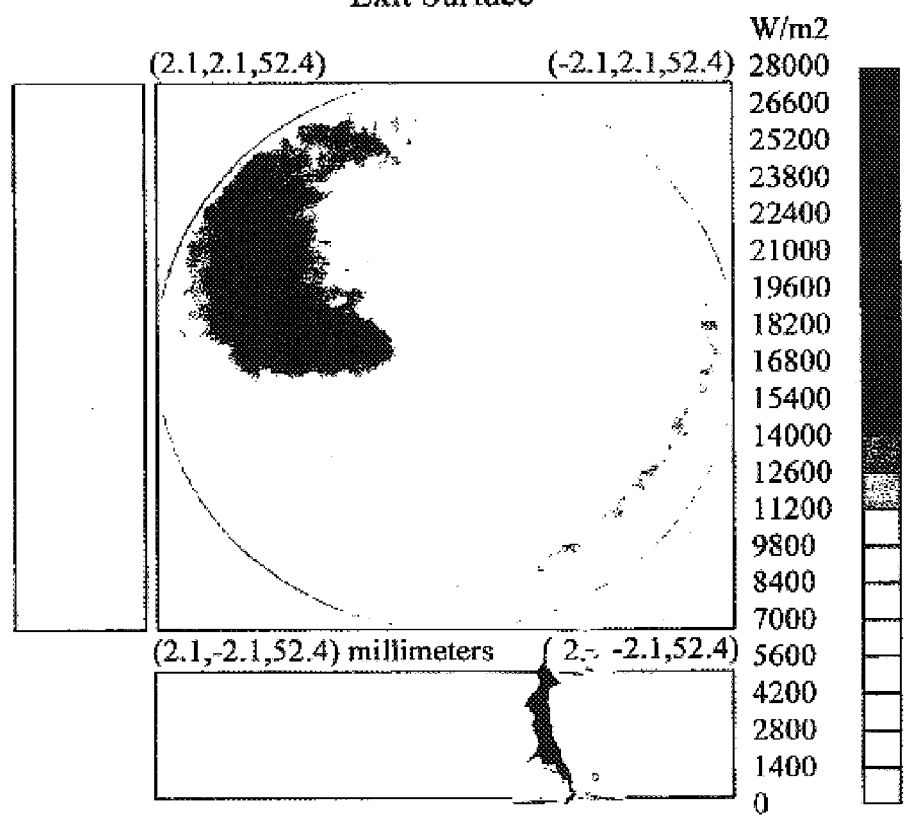
Figure 4C:
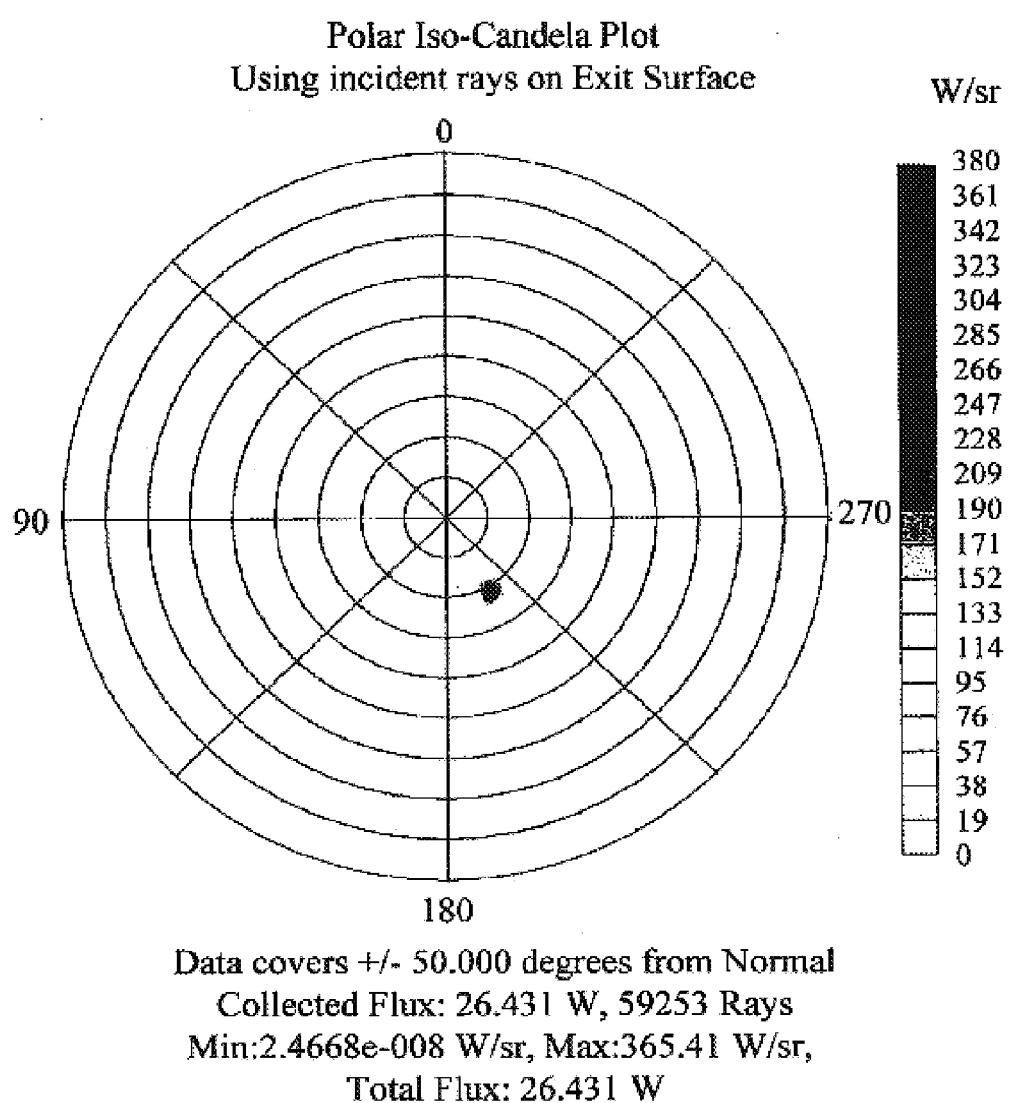

Rotating the filament 16 of FIG. 4a produces an intensity plot illustrated by FIG. 4b. Because the filament 16 was rotated, the hole 60 in the center of the plot remains centered within the plot after the 90-degree rotation. Translation of the filament 16 of FIG. 4a by one millimeter, however, greatly diminishes the angular distribution within the spectroscopic system, as depicted in FIG. 4c. Angular distributions are sporadic, and often completely shadowed by the modest translation of the radiation source lamp 14.

The ray trace plots of FIGS. 3(a–c) and FIGS. 4(a–c) illustrate that the spatial and angular distribution of light at the focus 26 of a standard radiation source 14 is highly unstable with respect to modest translations and/or rotations of its filament 16. Areas of higher incidence and intensity may form "hot spots" during illumination. In an attempt to maximize the signal-to-noise ratio (SNR), the radiation source 14 could be increased to the thermal and/or comfort limits established by the patient. However, if there are "hot spots" across the tissue, these areas may require a lower overall radiation output and corresponding result of lower SNR. Thus, uniform intensity illumination is desired when attempting to maximize the SNR for tissue measurements such as glucose.

The above plots clearly illustrate angular and spatial variances associated with the illumination system. These variances translate into spectroscopic variances that adversely influence the achievement of high levels of accuracy in measuring analyte concentrations. Inhomogeneous spatial and angular distributions of emitted radiation 24 impede a practitioner from constructing chemometric models that are sensitive to the differences between interferents and the desired analyte. Modest and unaccounted for translations and/or rotations of the emitter 14, such as those that might result from loose mechanical tolerances or vibration, have been found to significantly alter these relied upon chemometric models. An additional experiment was conducted to illustrate the effect of interferent variations on a calibrated chemometric model.

Figure 5:
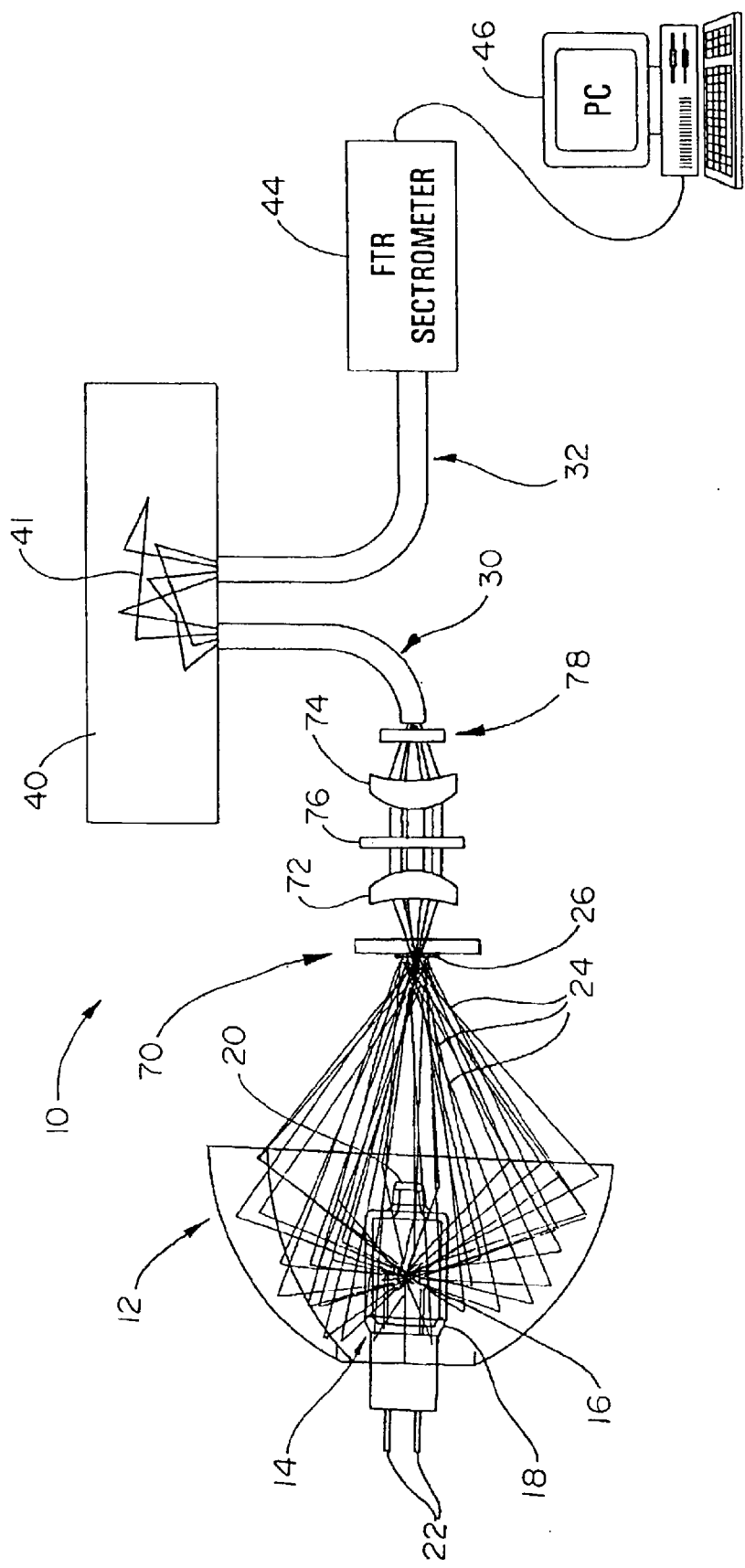
FIG. 5 is a diagrammed view of a system for constructing a chemometric model for measuring glucose concentration in the forearm's of various subjects.

FIG. 5 shows a diagrammed view of the system used for constructing a chemometric model for measuring glucose concentration in the forearm of various subjects. The components within this instrument system closely resemble those in FIG. 2 and like elements are numbered the same. The additions utilized should not be construed as an exhaustive list for constructing an accurate chemometric model for glucose measurement. Identification of these additions is merely for illustrative purposes only, as one of skill in the art may readily identify numerous combinations of instrument components that could achieve a chemometric model for the desired analyte.

The first of the additions shown in FIG. 5 is a five (5) millimeter aperture 70 positioned at the focal point of the elliptical reflector 26. This aperture 70 limits the amount of emitted radiation 24 permitted to pass through the system 10 for analysis. Once the radiation clears the aperture 70, a silicon lens 72 redirects the radiation through a cyan filter 76, which in turn, sends the radiation through a second silicon lens 74. Radiation transmitted through this series of lenses is then filtered to absorb radiation at wavelengths at or greater than 2.7 micron by passing through filter/diffuser 78. In a preferred embodiment, a WG295 filter/diffuser is utilized to absorb the wavelengths at or greater than 2.7 micron. The radiation is then illuminated upon a sample 40, collected and analyzed as described in relation to FIG. 2.

Using the above-described system, numerous calibration spectra spanning a wavelength range of approximately 1.25 $\mu$m to 2.5 $\mu$m were used to construct a chemometric model for measuring glucose concentrations within forearms' of subjects. The calibration set spanned several different lamps, many human subjects, a wide range of glucose values, and a variety of operating temperatures, and relative humidities.

During the "prediction" phase of the experiment, eleven human subjects were measured by the spectrometer system four times each day. Additionally, the radiation source lamp 14 for the system was changed every two days. As a note, the human subjects and lamps used in this prediction phase of the experiment were not the same as those used during the calibration phase. The results of this experiment are shown in FIG. 6, where the errors are sorted by day.

Figure 6:
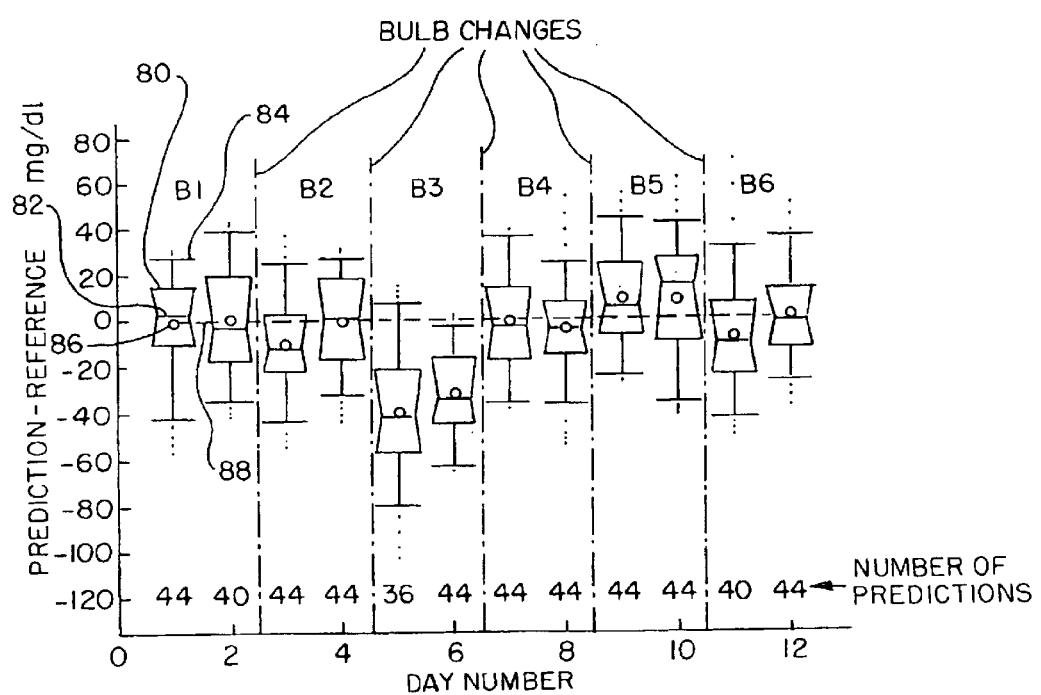
FIG. 6 is a box and whisker plot of prediction error versus day across five lamp changes using the system illustrated in FIG. 5.

FIG. 6 shows a "box and whisker" plot. In this type of plot, the median prediction error for each day is plotted as a horizontal line 82 in the middle of a box 80, which encompasses the middle half of the data, and "whiskers" 84 are plotted at the 5th and 95th percentiles; a "dot" 86 represents the mean prediction error for the day; the horizontal dashed line 88 shows where the data are centered when the prediction error bias is zero; and the numbers shown at the bottom of the graph indicate the number of predictions associated with that whisker and taken on each study day.

FIG. 6 specifically shows a box and whisker plot of prediction error versus day across five lamp changes, six lamps in total, over twelve days. During the first four days of the experiment, regarding lamps 1 and 2, the absolute prediction error bias was less than 20 mg/dl. After the second lamp change, however, (on days 5 and 6 of the experiment) the absolute bias increased dramatically. Replacing the third lamp with a fourth (on day 7 of the experiment) reduced the bias to well under 20 mg/dl.

These results suggest that the chemometric model was sufficiently "robust" as to permit accurate determination of the glucose levels for the subjects for most of the lamps, even though the lamps used during the prediction phase were not the same as those used during calibration. With regard to the third lamp, however, the chemometric model failed to produce accurate predictions. This failure suggests that the emission characteristics of this lamp were substantially out of the calibration range used to build this experimental chemometric model.

Figure 7:
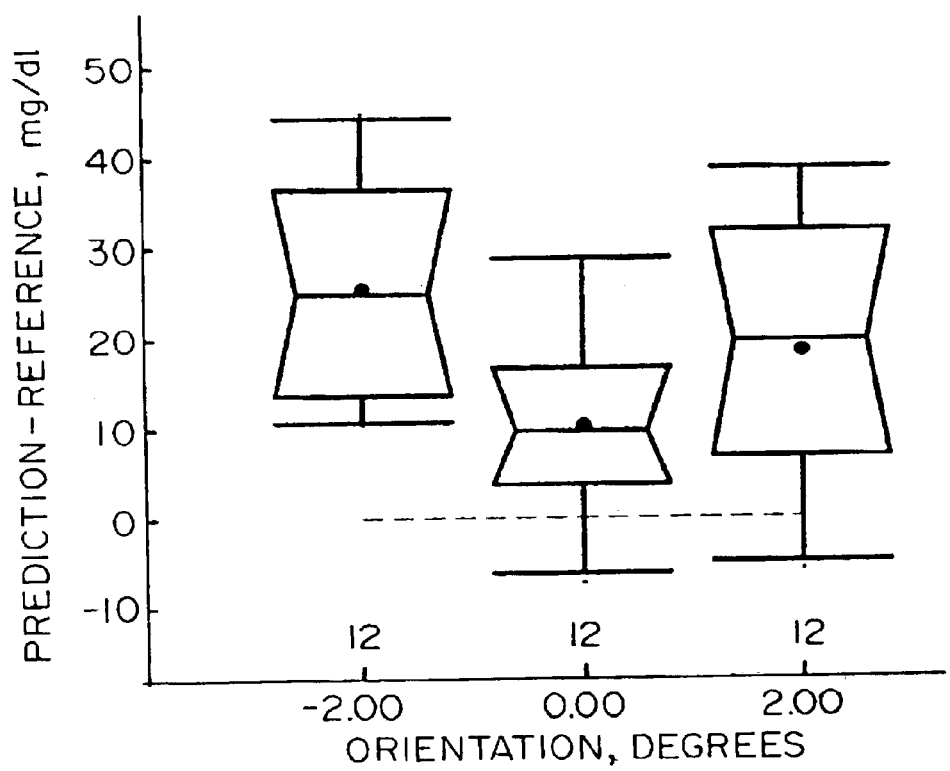
FIG. 7 is a box and whisker plot of in-vivo prediction errors versus orientation for a lamp within a system illustrated in FIG. 5.

To help isolate the emitter variation as the source of the prediction errors described above, another experiment was conducted using the same apparatus, and similar methods as described in the previous experiment. In this subsequent experiment, however, spectra were collected from three different subjects all on the same day, using the same lamp throughout the prediction period. The lamp was installed in the apparatus at some arbitrary azimuthal orientation, $\theta_0$, and spectra of the subject's forearms were taken at $\theta_0$, as well as at $\theta_0$ +/− 2 degrees. The resulting prediction errors are plotted in FIG. 7 for the three lamp orientation states. These results indicate that changes in the emitter characteristics, which are the result of small rotations of the lamp, can cause prediction errors that are almost as large as those caused by complete replacement of one lamp with another.

A third experiment was then conducted to evaluate the effects of lamp changes on prediction error. The system utilized is depicted in FIG. 8, with like elements numbered the same as in FIG. 2 and FIG. 5. In this experiment, the sample source of living tissue 40 (a subject's forearm) was replaced with a "tissue phantom" 43. Tissue phantoms 43 consist of a scattering solution made of microscopic polystyrene beads suspended in water at varying concentrations. In this experiment, the concentration range for the polystyrene beads was between 5000–8000 mg/dl. Tissue phantoms 43 within these ranges are representative substitutes for living tissue because their optical scattering and absorption properties are similar to those of biological tissue. Additionally, the use of tissue phantoms of known concentrations eliminates the confounding effects often observed from physiological changes in living tissue. FIG. 8 diagrams the replacement of a subject's forearm 40 with a tissue phantom 41. Further, the cyan filter 76 is located after the output fiber optic 32. In all other respects, the apparatus diagrammed in FIG. 8 is consistent with those discussed in detail with respect to FIG. 2 and FIG. 5.

Figure 9A:
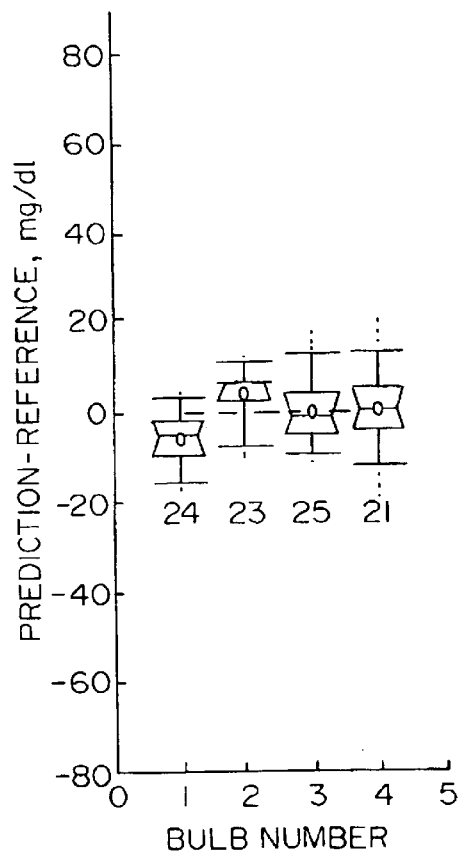
FIG. 9a is a box and whisker plot of cross-validated prediction errors for the system illustrated in FIG. 8, in the absence of a lamp change.

A set of ninety-eight different tissue phantoms composed of five different analytes at different concentrations was optically sampled. In order to assess the ability of the system in FIG. 8 to predict glucose concentrations in the absence of lamp changes, a "cross-validation" analysis was performed. To accomplish this cross-validation analysis, a series of baseline measurements were performed wherein spectra of all ninety-eight solutions were taken using a single lamp with the apparatus depicted in FIG. 8. This data was artificially subdivided into four sets. Using three of these sets, a chemometric model was constructed to predict glucose values for the remaining set. The analysis procedure was again repeated, rotating the data sets used for calibration and prediction, until all four sets had been used for prediction. The results of the cross-validation are shown in FIG. 9a. The prediction errors biases shown in FIG. 9a are clustered near 0 mg/dl. Such clustering suggests that in the absence of a lamp change, this apparatus is capable of making satisfactory measurements of glucose concentration with these samples.

Figure 9B:
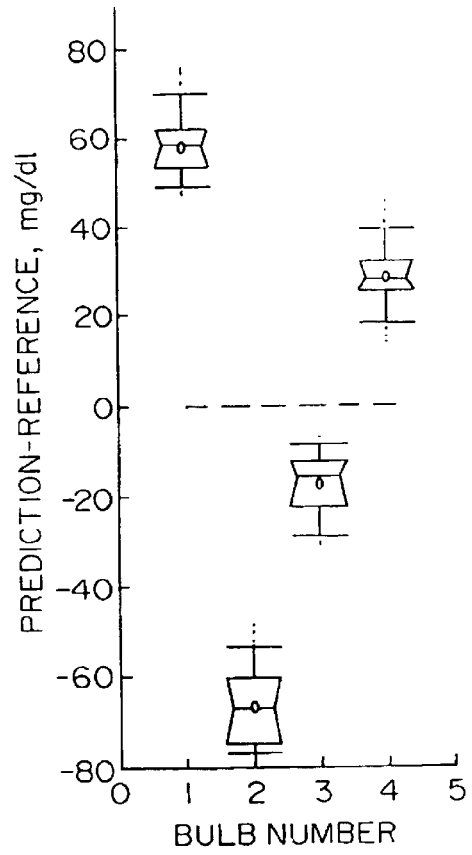
FIG. 9b is a box and whisker plot of cross-validated prediction errors for the system illustrated in FIG. 8, with the inclusion of lamp changes.

Another cross-validation analysis was then performed. In this cross-validation analysis, the ninety-eight solutions discussed above were grouped into four subsets, and a different lamp was assigned for use as the illumination source for each subset. In this analysis, data from three of the lamps was used to build a chemometric model to predict glucose in data from the fourth lamp. This chemometric modeling procedure was repeated until each of the four data sets was used for prediction. The prediction results for the four data sets are presented in FIG. 9b. A comparison between the four data sets shows a very large lamp-to-lamp prediction bias. These results are again consistent with the findings presented in FIG. 6 (the replacement of individual lamps) and FIG. 7 (the modest rotation and/or translation of a single lamp by +/− 2 degrees), thus further illustrating the deleterious effects of interferents, such as illumination system variations, on the development of accurate chemometric models for preferred systems of the present invention.

Figure 10:
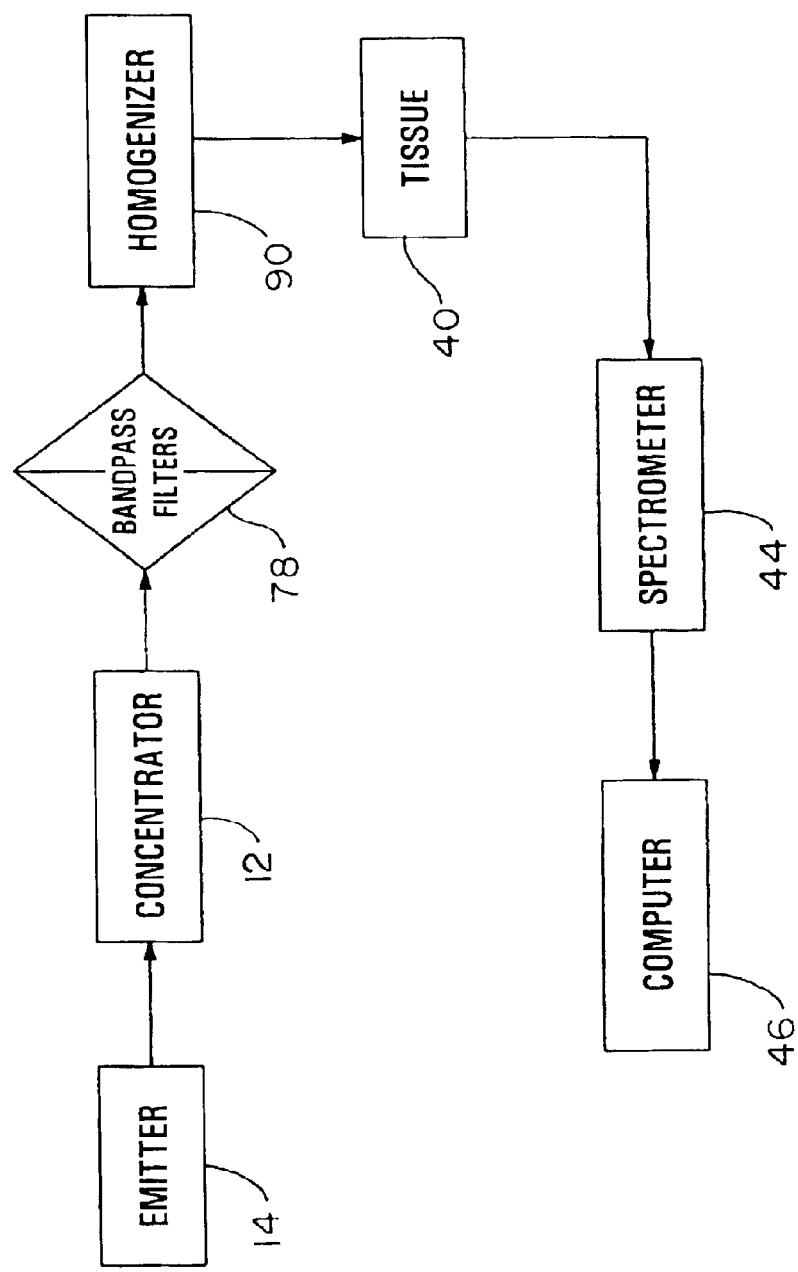
FIG. 10 is a diagrammed view of a system of the present invention using a means for spatially and angularly homogenizing emitted radiation.

The apparatus diagrammed in FIG. 10 is consistent with those discussed in detail with respect to FIG. 5, with the clear identification of a radiation homogenizer 90. In a preferred embodiment, the homogenizer 90 is positioned between the filter 78 and the sample 40, as depicted in FIG. 10. At this location, entering nearly monochromatic radiation is spatially and angularly homogenized prior to its distribution upon the sample 40. The placement of the homogenizer 90 at the above-described location is not to be construed as restricting the scope of the invention. The system depicted in FIG. 10 is significantly simplified for illustrative purposes. Only certain specific elements within a far more elaborate spectroscopic system are diagrammed. All the elements depicted in FIG. 10, however, are common to preferred spectroscopic systems of the present invention. The elements diagrammed, therefore, are to aid in identification of various aspects of the overall spectroscopic system. Thus, it should be understood that the present invention encompasses embodiments wherein various components of a spectroscopic system may be assembled in a relative order other than the one explicitly diagrammed in FIGS. 10 and 15. However, the homogenizer 90 is placed at a point between the emitter 14 and the tissue or sample 40, although other elements may be included between the homogenizer 90 and emitter 14 or between the homogenizer 90 and tissue or sample 40. This can also include the spectrometer 44, which in certain embodiments can be positioned between the emitter 14 and tissue 40.

Figures 11A, 11B:
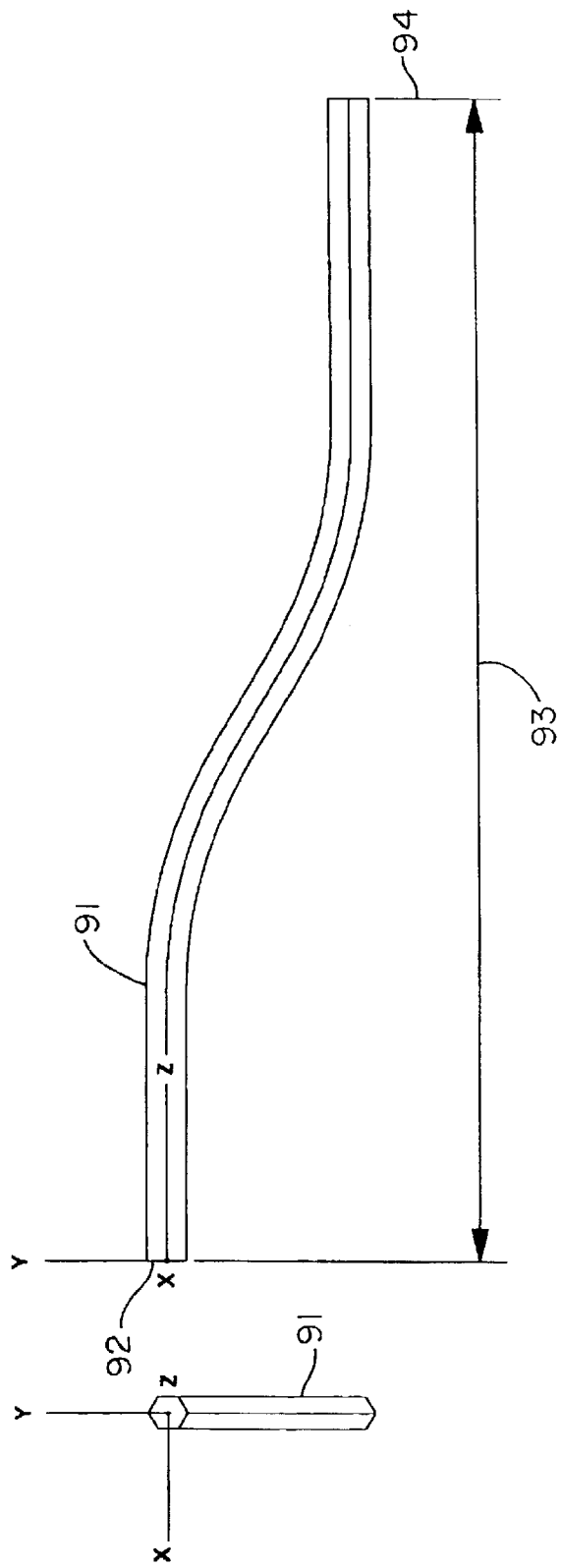
FIG. 11a and FIG. 11b illustrate a detailed perspective and plan view of a light pipe of the present invention.

In a preferred embodiment, the radiation homogenizer 90 is a light pipe. FIGS. 11a and 11b show a perspective end view and a detail plan view of a light pipe 91 of the present invention. Light pipe 91 is generally fabricated from a metallic, glass (amorphous), crystalline, polymeric, or other similar material, or any combination thereof. Physically, the light pipe comprises a proximal end 92, a distal end 94, and a length 96 therebetween. The length of a light pipe 91, for this application, is measured by drawing a straight line from the proximal end 92 to the distal end 94 of the light pipe. Thus, the same segment of light pipe 91 may have varying lengths depending upon the shape the segment forms. The length of the segment readily varies with the light pipe's intended application.

In a preferred embodiment as illustrated in FIGS. 11a and 11b, the segment forms an S-shaped light pipe. The S-shaped bend in the light pipe provides angular homogenization of the light as it passes through the light pipe. This conclusion is documented by the experiment and discussion associated with FIGS. 13a–c and 14a–c below. It is, however, recognized that angular homogenization can be achieved in other ways. A plurality of bends or a non-S-shaped bend could be used. Further, a straight light pipe could be used provided the interior surface of the light pipe included a diffusely reflective coating over at least a portion of the length. The coating provides angular homogenization as the light travels through the pipe. Alternatively, the interior surface of the light pipe can be modified to include dimples or "microstructures" such as micro-optical diffusers or lenses to accomplish angular homogenization. Finally, a ground glass diffuser could be used to provide some angular homogenization.

The cross-section of the light pipe 91 may also form various shapes. In particular, the cross-section of the light pipe 91 is preferably polygonal in shape to provide spatial homogenization. Polygonal cross-sections include all polygonal forms having three to many sides. Certain polygonal cross-sections are proven to improve spatial homogenization of channeled radiation. For example, a light pipe possessing a hexagonal cross-section the entire length thereof provided improved spatial homogenization when compared to a light pipe with a cylindrical cross-section of the same length.

Additionally, cross-sections throughout the length of the light pipe may vary. As such, the shape and diameter of any cross-section at one point along the length of the light pipe may vary with a second cross-section taken at a second point along the same segment of pipe.

In certain embodiments, the light pipe is of a hollow construction between the two ends. In these embodiments, at least one lumen or conduit may run the length of the light pipe. The lumens of hollow light pipes generally possess a reflective characteristic. This reflective characteristic aids in channeling radiation through the length of the light pipe so that the radiation may be emitted at the pipe's distal end. The inner diameter of the lumen may further possess either a smooth, diffuse or a textured surface. The surface characteristics of the reflective lumen or conduit aid in spatially and angularly homogenizing radiation as it passes through the length of the light pipe.

In additional embodiments, the light pipe is of solid construction. The solid core could be cover plated, coated, or clad. Again, a solid construction light pipe generally provides for internal reflection. This internal reflection allows radiation entering the proximal end of the solid light pipe to be channeled through the length of the pipe. The channeled radiation may then be emitted out of the distal end of the pipe without significant loss of radiation intensity. An illustration of internal reflection and the resulting channeling is shown in FIG. 12.

FIG. 12 depicts a plan view of a ray trace showing radiation 24 from a light source 14 (40-watt tungsten-halogen bulb) focused by an elliptical reflector 12 into, and through, a light pipe 91 of the present invention. In particular, FIG. 12 illustrates how emitted radiation from a radiation source lamp is focused upon the proximal end of the light pipe of the present invention. The focused radiation is internally reflected throughout the length of the light pipe. As the radiation is reflected, specific structural characteristics of the light pipe (here an S-shaped segment of hexagonal cross-sectioned pipe) angularly and spatially homogenizes the resulting radiation emitted at the pipe's distal end.

FIGS. 13(a–c) are plots of the incidance of emitted radiation from the elliptical reflector and light pipe depicted in FIG. 12. These plots have again been generated using TracePro V2.1, a ray trace program simulating the spatial distribution of emitted radiation from the radiation source emitter. More specifically, the plots of incidance are representative of the spatial distribution of emitted radiation at the distal end of the light pipe diagrammed in FIG. 12.

Figure 13A:
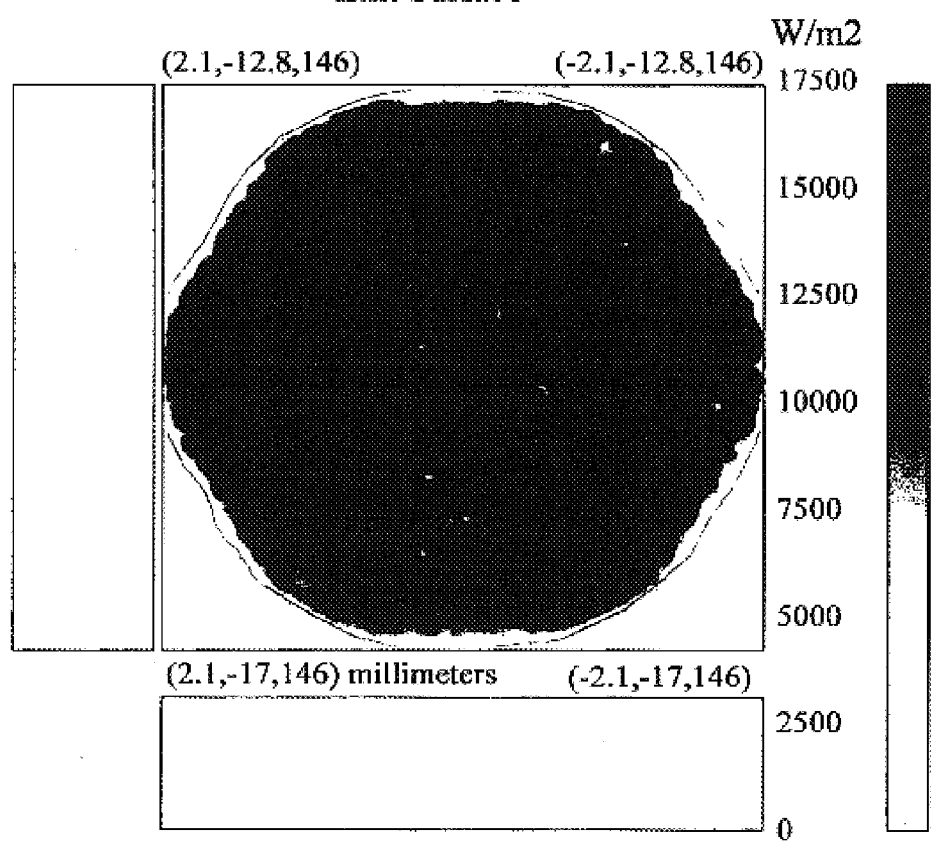
FIG. 13a is an incidance plot using a ray trace program simulating the spatial distribution of emitted radiation using a light pipe of the present invention.

FIG. 13a shows a plot of incidance of emitted radiation from the radiation source lamp coupled to the light pipe of the present invention. The resulting incidance plot is characterized by a substantial degree of spatial homogeneity. Spatial distribution of emitted radiation throughout the incidance plot varies slightly. A comparison of FIG. 13a with that of FIG. 3a illustrates the substantial improvement in spatial distribution throughout the incidance plot when using a light pipe of the present invention.

Figure 13B:
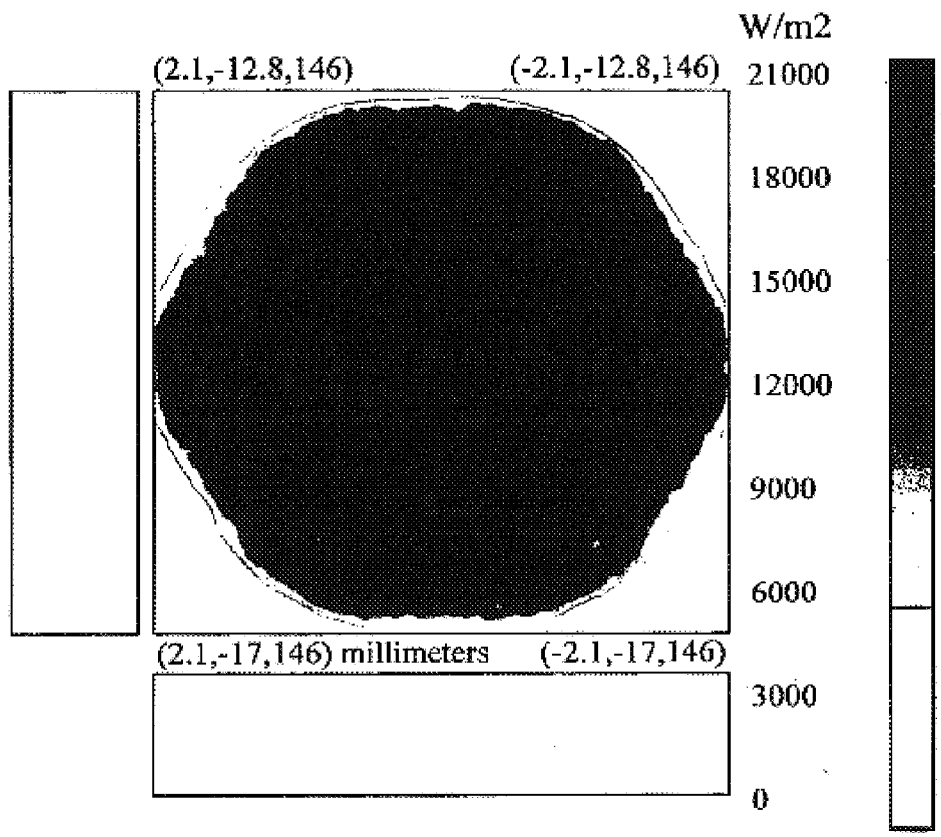

FIG. 13b shows a plot of incidance of the same radiation source lamp coupled to the light pipe of the present invention as depicted in FIG. 13a, but after a 90-degree rotation of the filament producing the incidance plot. Again, the resulting incidance plot is characterized by a substantial degree of spatial homogeneity. In fact, there exist few detectable differences in spatial distribution after the resulting 90-degree rotation as with the spatial distribution prior to the rotation.

Figure 13C:
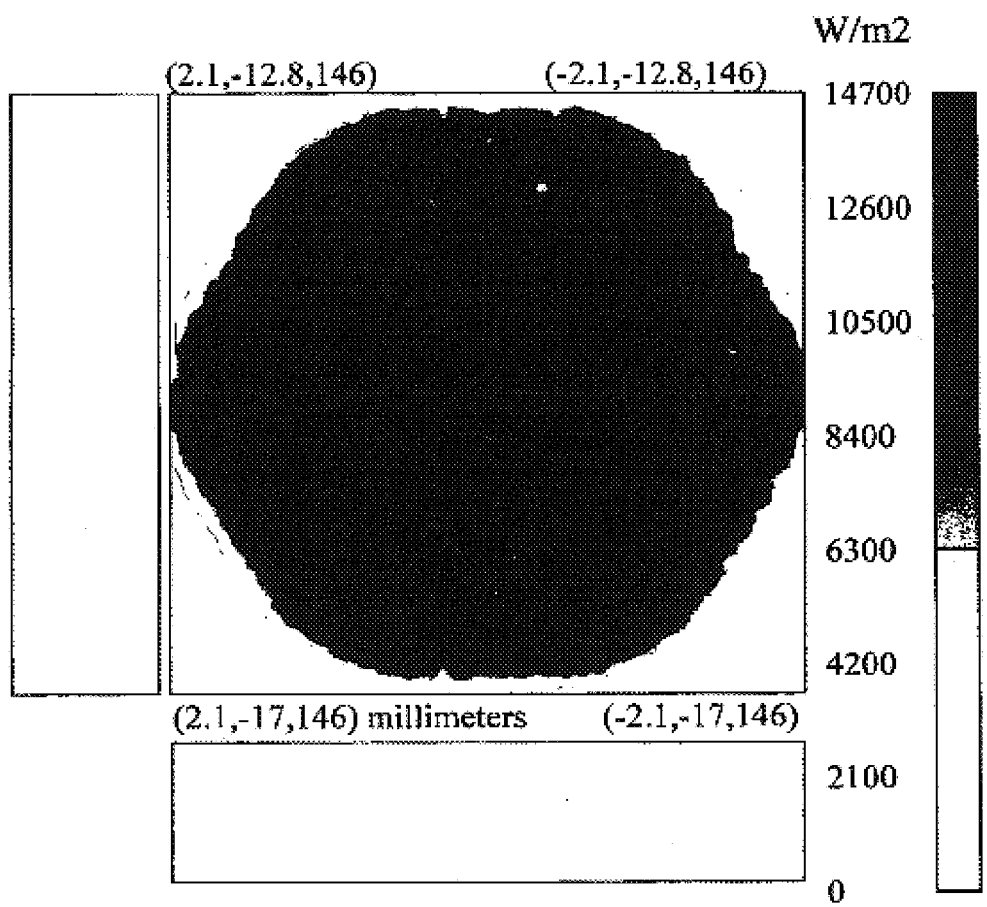

FIG. 13c further depicts the spatial homogeneous distribution of emitted radiation using a light pipe of the present invention. Again, the spatial distribution in FIG. 13c, after a one-millimeter translation, is very similar to those spatial distributions in FIGS. 13(a–b).

Similar to FIGS. 13(a–c), FIGS. 14(a–c) show plots of the intensity of emitted radiation from the elliptical reflector and light pipe depicted in FIG. 12. These plots have also been generated using TracePro V2.1 to simulate the angular distribution of emitted radiation from a radiation source emitter known in the art. More specifically, the plots of intensity are representative of the angular distribution of emitted radiation at the distal end of the light pipe diagrammed in FIG. 12.

Figure 14A:
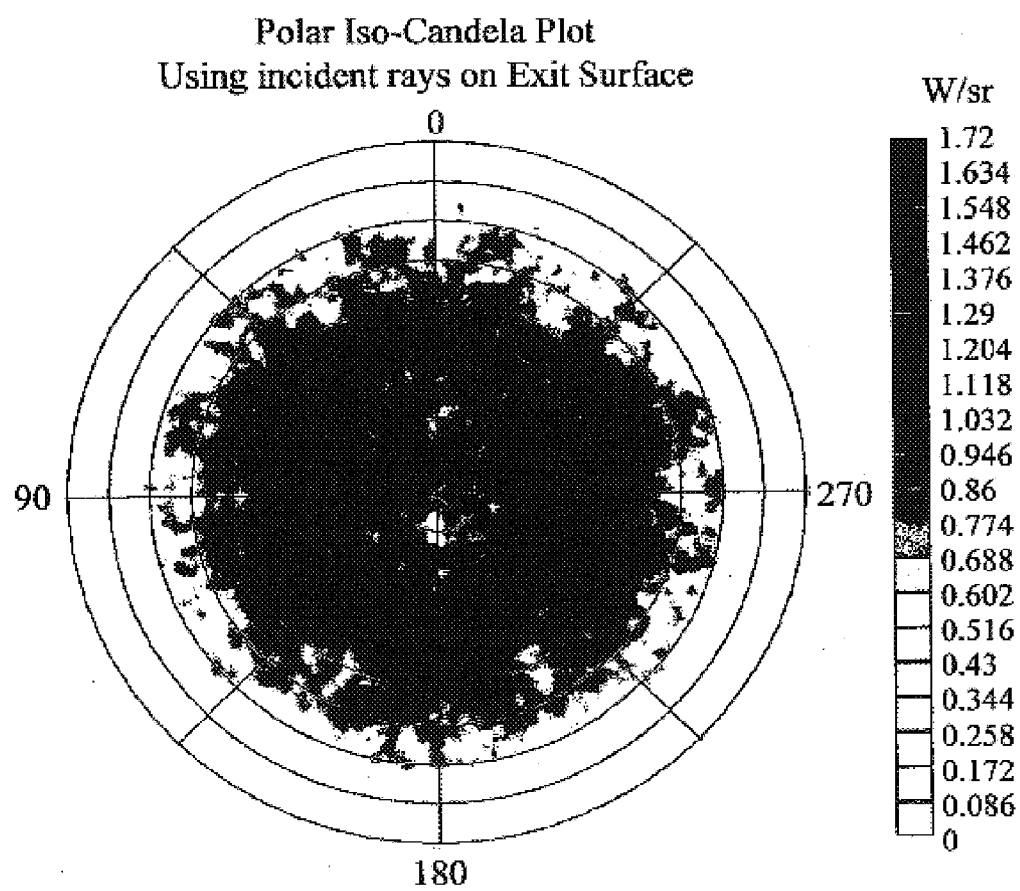
FIG. 14a is an intensity plot using a ray trace program simulating the angular distribution of emitted radiation using a light pipe of the present invention.

FIG. 14a shows a plot of intensity of emitted radiation from the radiation source lamp coupled to the light pipe of the present invention. The resulting intensity plot from the standard radiation source is characterized by a substantial degree of angular homogeneity. Angular distributions throughout the plot vary slightly. A comparison of FIG. 14a with that of FIG. 4a illustrates the substantial improvement in angular distribution throughout the intensity plot when using a light pipe of the present invention. For example, the "hole" in the center of the intensity plot caused by the glass nipple on the end of the radiation source lamp is no longer present and is now replaced with homogenized angular radiation.

Figure 14B:
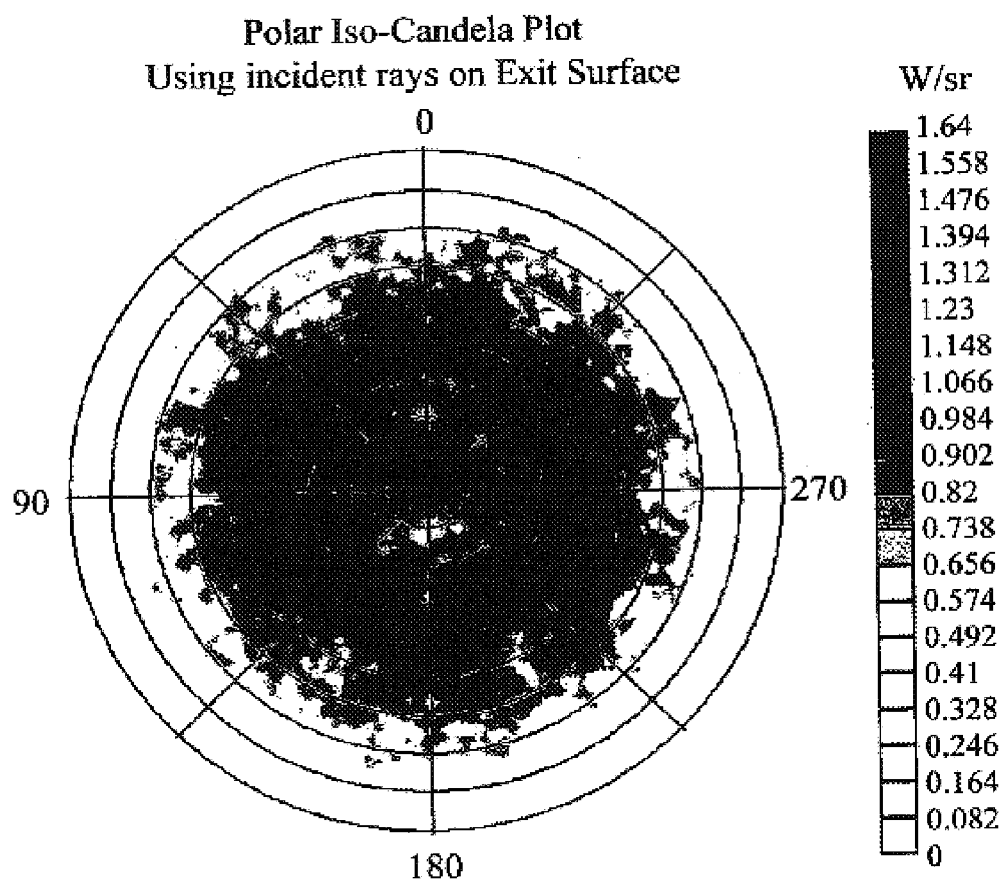
Figure 14C:
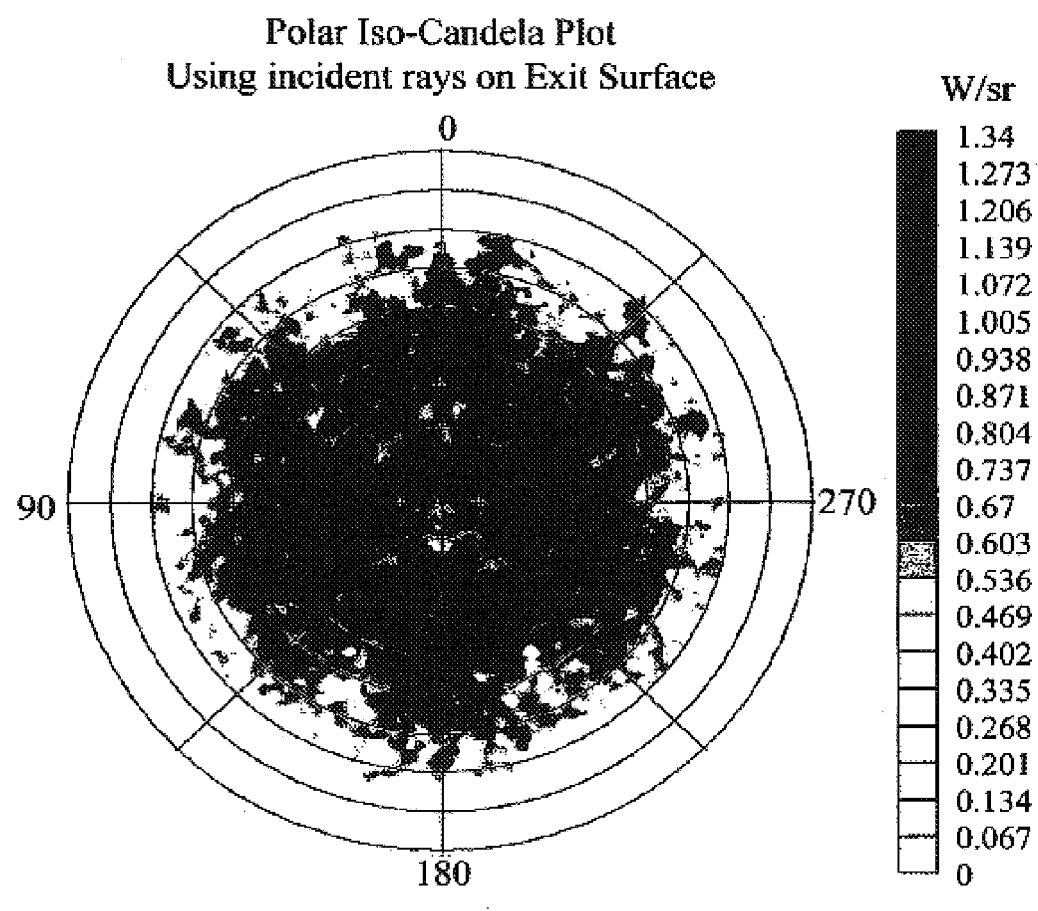

Rotating the filament of FIG. 14a by 90-degrees produces an intensity plot illustrated by FIG. 14b. Again, there are minor differences between the intensity plots after, and prior to, the rotation. Translation of the filament of FIG. 14a by one millimeter, as depicted in FIG. 14c, once again documents reduction in variation of angular distribution as compared to the plots of FIGS. 14a–b.

The ray trace plots of FIGS. 13(a–c) and 14(a–c) illustrate that the spatial and angular distribution of light at the output of the light pipe is highly stable with respect to modest translations and/or rotations of its filament. This is especially clear when comparing the ray trace plots of FIGS. 13(a–c) and FIGS. 14(a–c) using a light pipe of the present invention with FIGS. 3(a–c) and FIGS. 4(a–c) without the light pipe of the present invention. The light tube of the present invention has been effectively shown through these incidance and intensity plots to eliminate or substantially reduce the light source or illumination system as an interferent associated with chemometric modeling. It has been found that the use of the light pipe of the present invention allows construction of chemometric models of sufficient sensitivity to measure analyte concentrations.

Figure 15:
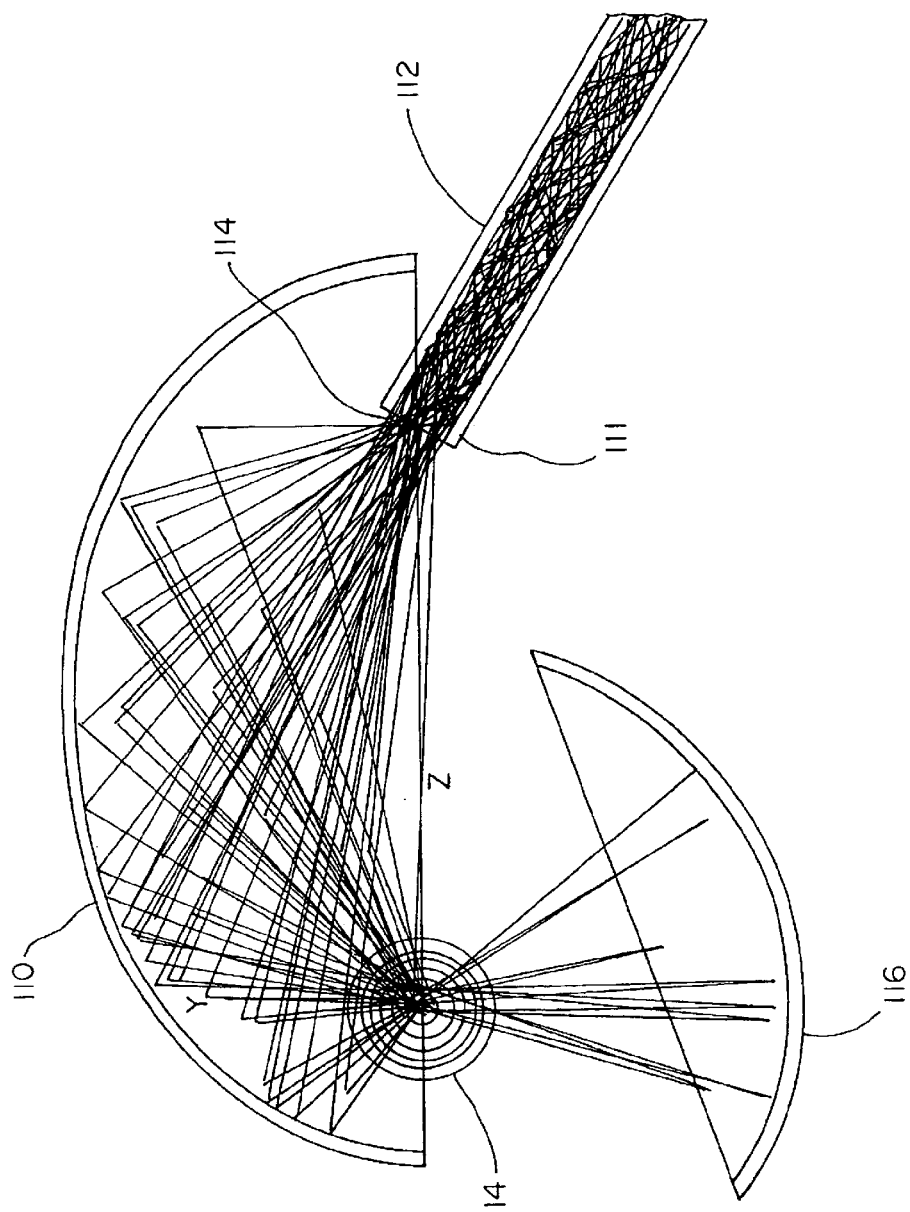
FIG. 15 is a schematic plan view of an alternative source and light pipe system of the present invention.

Another embodiment of the present invention is depicted schematically in FIG. 15. In this embodiment, the tungsten halogen source 14 is placed at one focus of an elliptical reflector 110, and the proximal end 111 of a light pipe 112 is placed at the other focus 114. To improve the collection efficiency of the system, a separate back reflector 116 is positioned opposite the elliptical reflector 110 to capture and redirect light which would otherwise be lost from the system. The distal end 118 of the light pipe 112 then provides the source of radiation for the spectroscopic sample.

Figure 16:
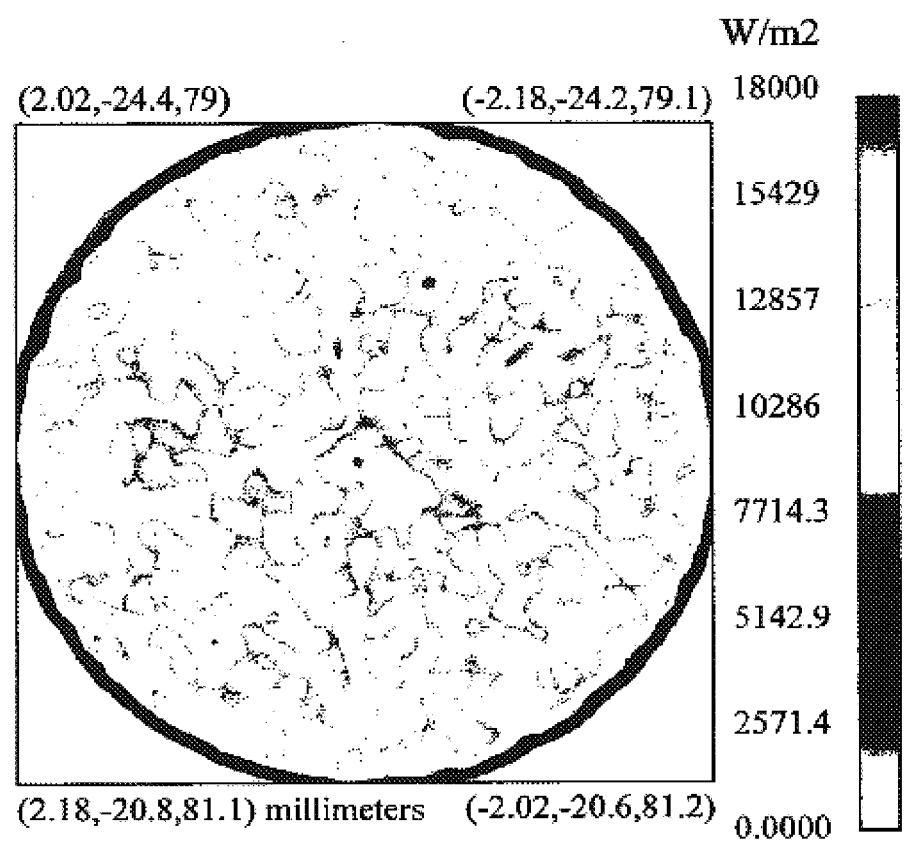
FIG. 16 is an incidance plot depicting homogenization of the light at the distal end of the light pipe of FIG. 15.
Figure 17:
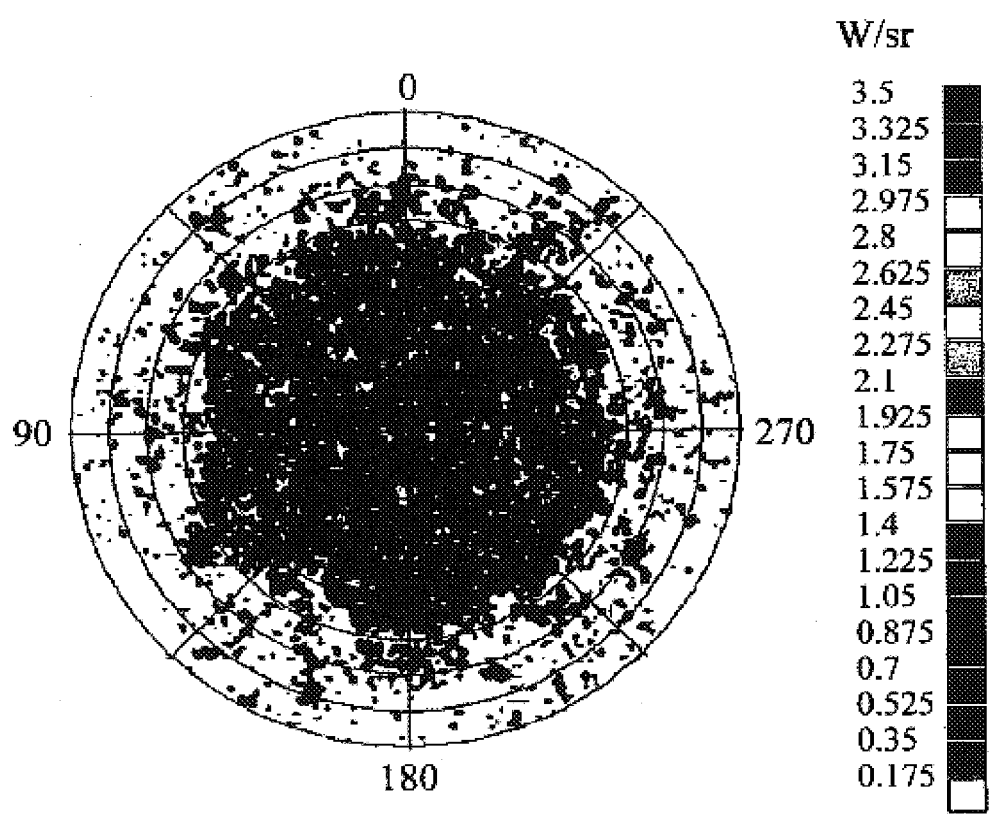
FIG. 17 is an intensity plot showing the homogenization of light emitted from the light pipe of FIG. 15.

FIGS. 16 and 17 show the simulated spatial and angular distributions of the light at the distal end 118 of the light pipe 112 of FIG. 15. These distributions show substantially improved homogenization as compared to the output of the standard system depicted in FIG. 1.

Figure 18:
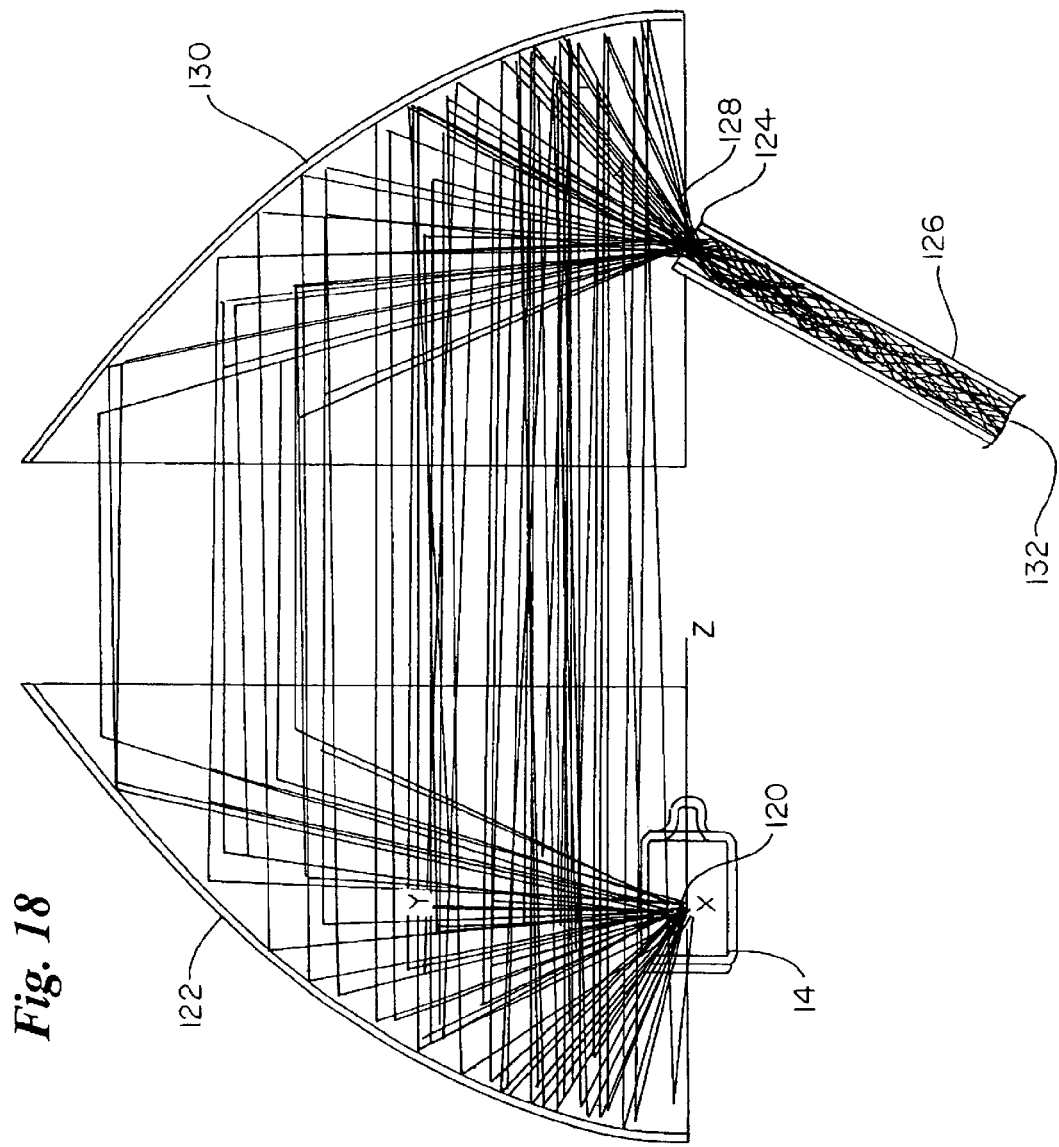
FIG. 18 is a schematic plan view of an alternative illumination source incorporating parabolic reflectors and a light pipe.
Figure 19:
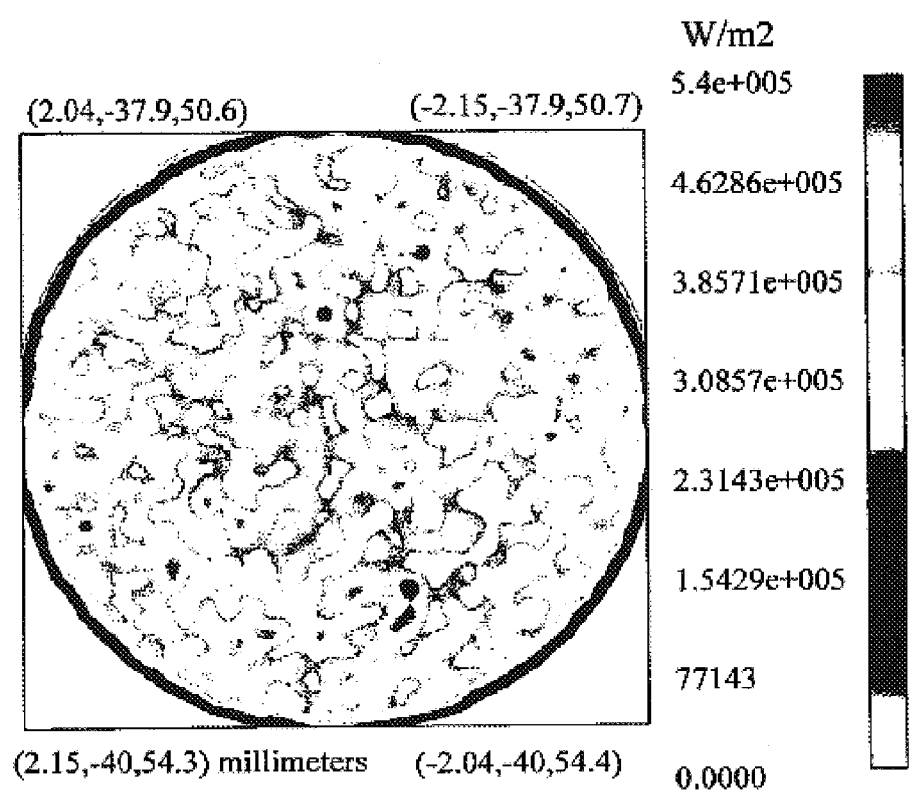
FIG. 19 is an incidance plot depicting spatial homogenization of the light.
Figure 20:
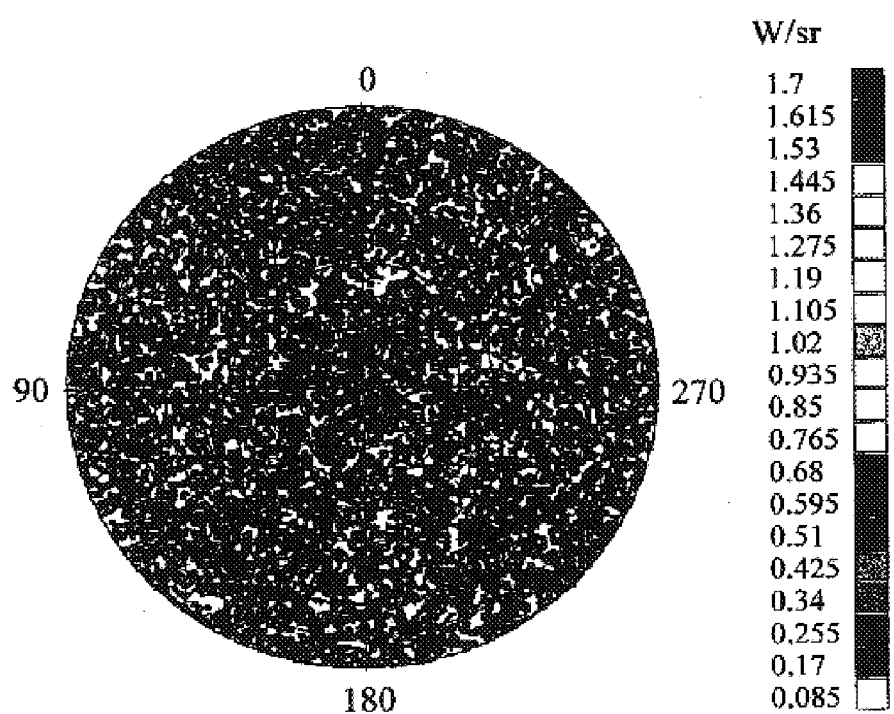
FIG. 20 is a plot of intensity showing the homogenization of light by the source in FIG. 18.

Another embodiment of the present invention is shown in FIG. 18. In this embodiment, the tungsten halogen source 114 is placed at the focus 120 of a section of a parabolic reflector 122, and the proximal end 124 of a light pipe 126 is placed at the focus 128 of a section of another parabolic reflector 130. The homogenized light exits the distal end 132 of the light pipe 126. The simulated spatial and angular distributions of the light at the distal end of the light pipe, shown in FIGS. 19 and 20, show substantially improved homogenization as compared to the output of the standard system depicted in FIG. 1.

Figure 21:
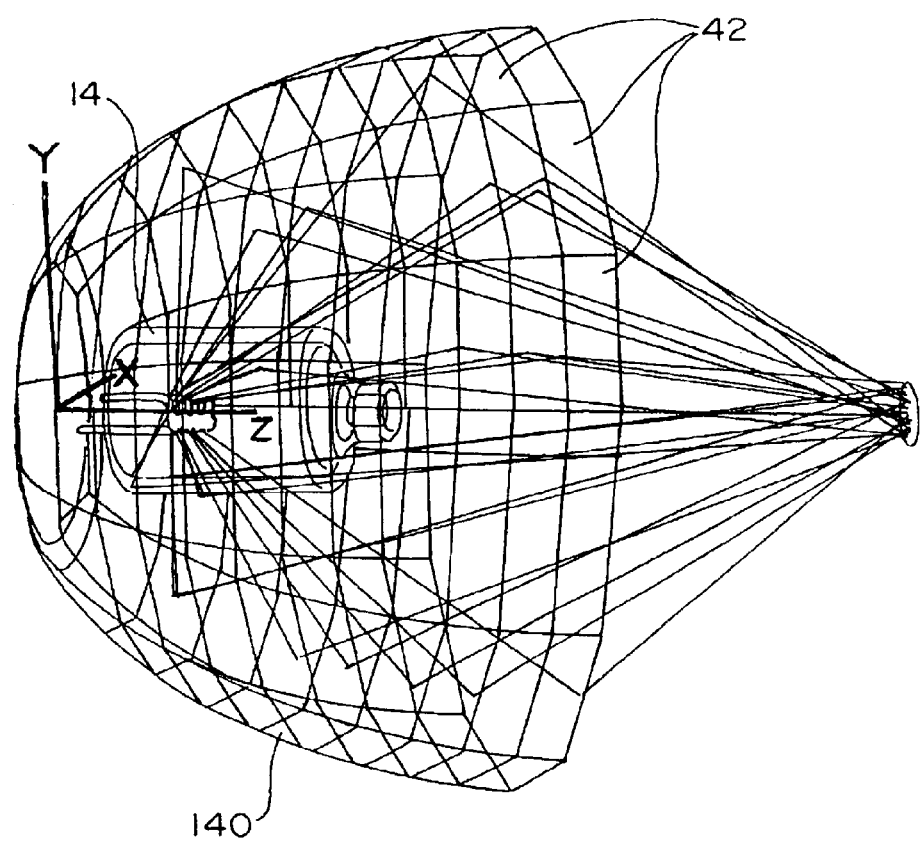
FIG. 21 is a schematic perspective view of an alternative illumination source incorporating faceted reflectors.
Figure 22:
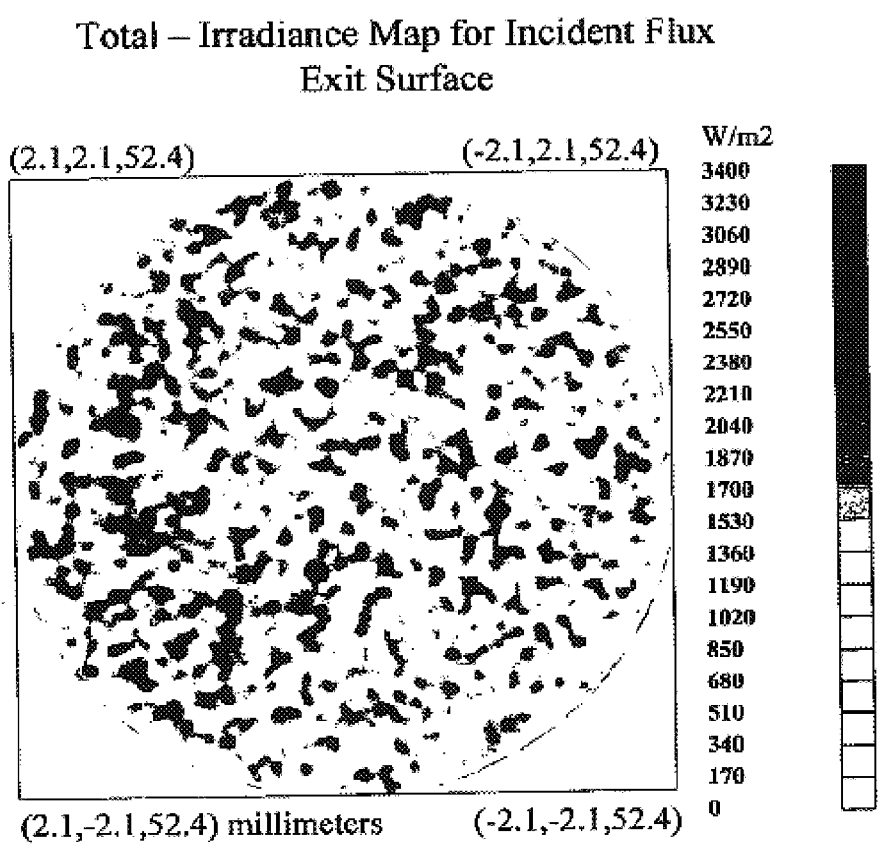
FIG. 22 depicts spatial distribution of the light showing spatial homogenization achieved through the system of FIG. 21.
Figure 23:
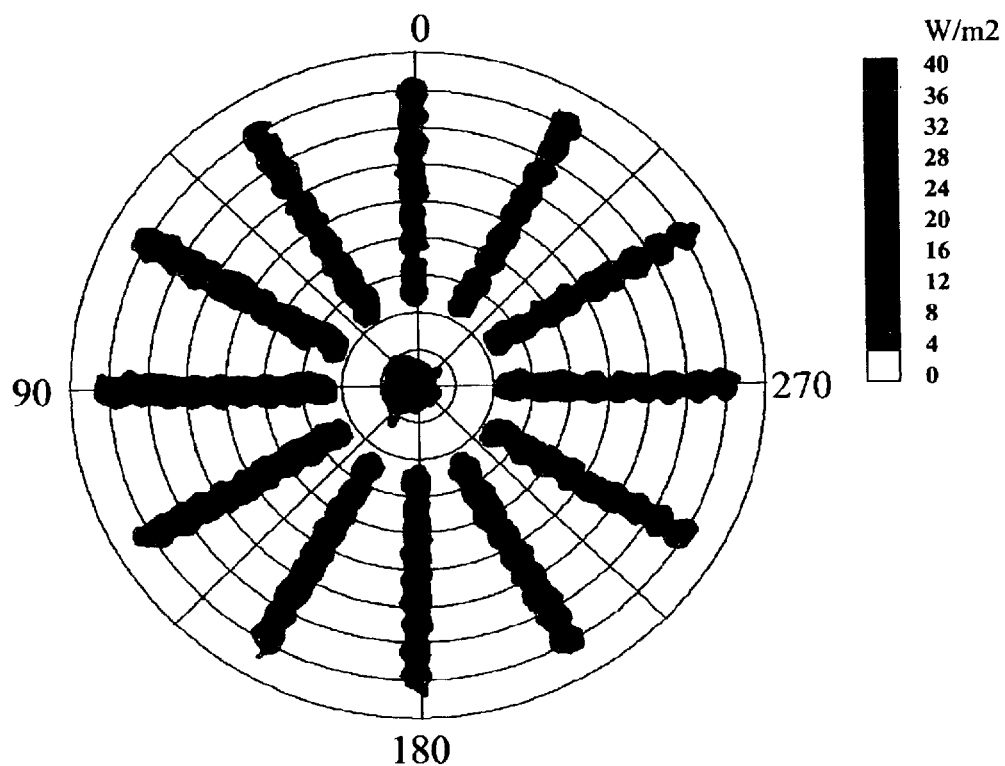
FIG. 23 is a plot of angular distribution produced by the device of FIG. 21.

Another embodiment of the present invention is shown in FIG. 21. This embodiment is similar to the standard system depicted in FIG. 1, except that the standard elliptical reflector has been replaced with a faceted reflector 140. This faceted reflector 140 has the same general form as the elliptical reflector of FIG. 1, but the smoothly varying shape of the standard elliptical form has been replaced with flat mirror facets 142 which locally approximate the standard shape. Such faceted reflectors 142 provide a high degree of spatial uniformity. FIG. 22 is a simulated spatial distribution of the light at the second focus of the ellipse, showing substantially improved spatial homogeneity as compared to the output of the standard system of FIG. 1. FIG. 23 is a simulated angular distribution at the second focus of the ellipse which, unlike the other embodiments disclosed herein, exhibits a high degree of non-uniformity.

The faceted elliptical reflector is an example of an embodiment of the present invention which produces only part of the desired characteristics in the output radiation. In the case of the faceted reflector 140, spatial homogenization is achieved but not angular homogenization. In other cases, such as passing the output of the standard system through ground glass, angular homogenization is achieved but not spatial homogenization. In embodiments such as these, where only angular or spatial homogenization is produced (but not both) some improvement in the performance of the spectroscopic system may be expected. However, the degree of improvement would not be expected to be as great as for systems where spatial and angular homogenization of the radiation are simultaneously achieved.

Another method for creating both angular and spatial homogenization is to use an integrating sphere in the illumination system. Although common to use an integrating sphere for detection of light, especially from samples that scatter light, integrating spheres have not been used as part of the illumination system when seeking to measure analytes noninvasively. In practice, radiation output from the emitter could be coupled into the integrating sphere with subsequent illumination of the tissue through an exit port. The emitter could also be located in the integrating sphere. An integrating sphere will result in exceptional angular and spatial homogenization but the efficiency of this system is significantly less than other embodiments previously specified.

Figure 24:
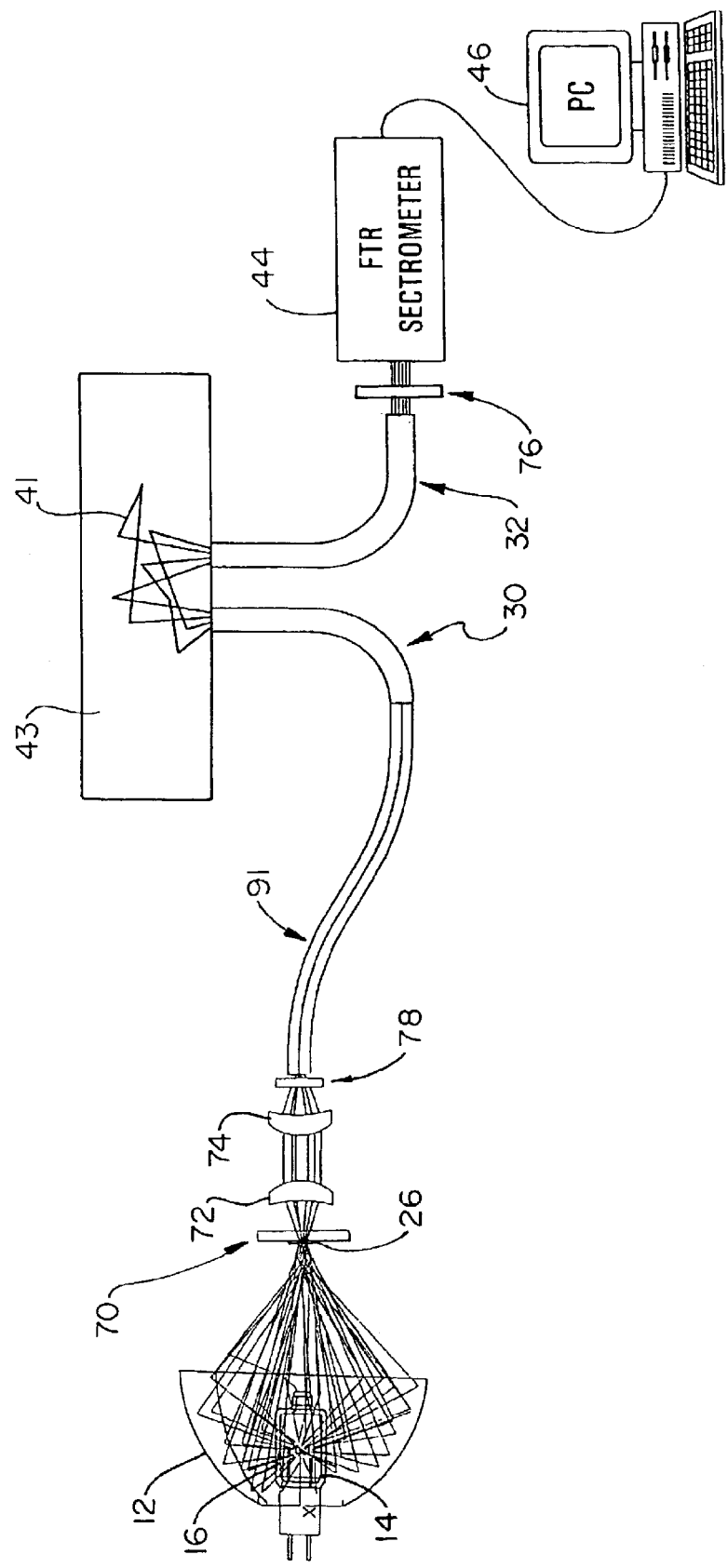
FIG. 24 is a diagrammed view of a system of the present invention for measuring glucose in scattering media having a tissue phantom as the sample source.

In order to evaluate the efficacy of the light tube of the present invention for reducing prediction error related to lamp variations, an experiment was conducted comparing a chemometric model using a light pipe of the present invention with a chemometric model without the light pipe of the present invention. The system of FIG. 8 depicts the system without the light pipe. FIG. 24 is a diagrammed view of the system of the present invention for measuring glucose in scattering media having a tissue phantom 43 as the sample source. The apparatus diagrammed in FIG. 24 is consistent with that discussed in detail with respect to FIG. 8 except for the S-bend light pipe 91 which is included at the focus of the second silicon lens 74.

Figure 25A:
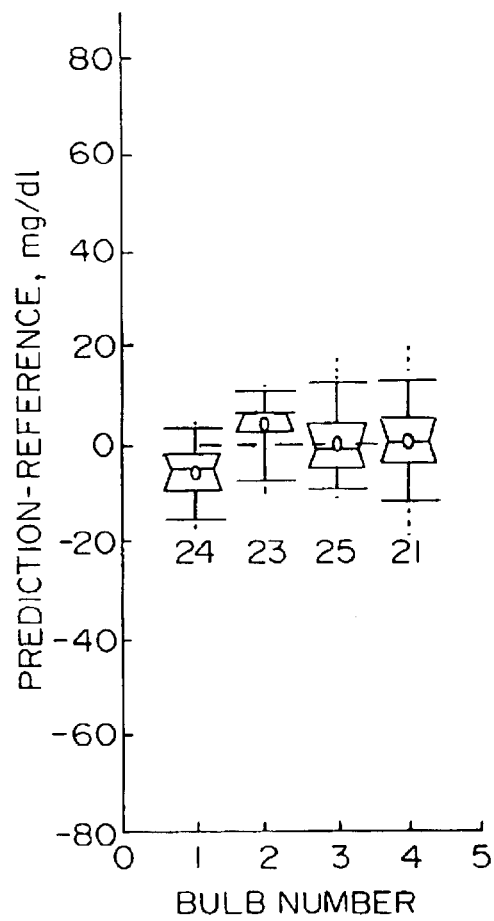
FIG. 25a is a box and whisker plot of a standard system with no bulb changes.
Figure 25B:
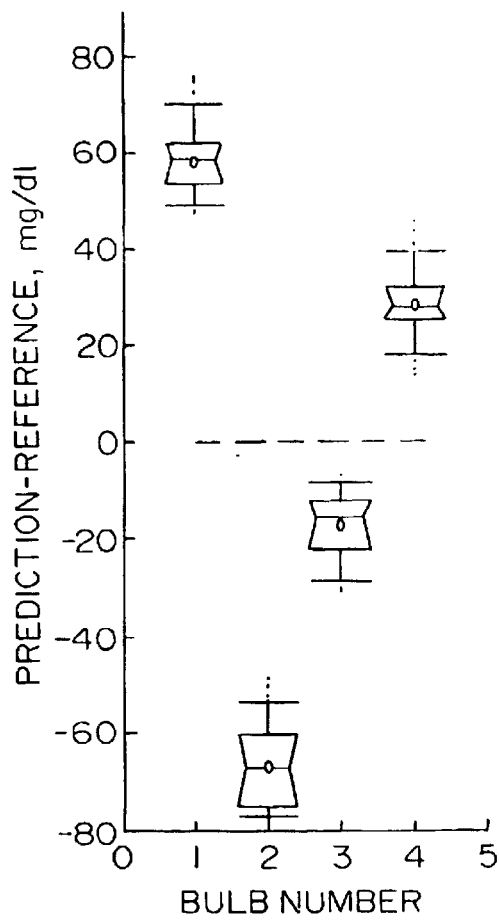
FIG. 25b is a box and whisker plot of a standard system across four bulb changes.
Figure 25C:
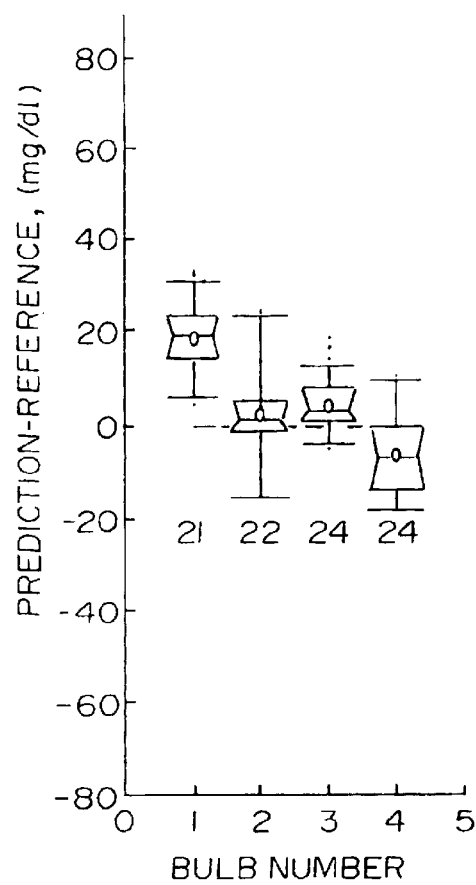
FIG. 25c is a box and whisker plot of a system using an s-bend light pipe across four bulb changes.
Figure 25D:
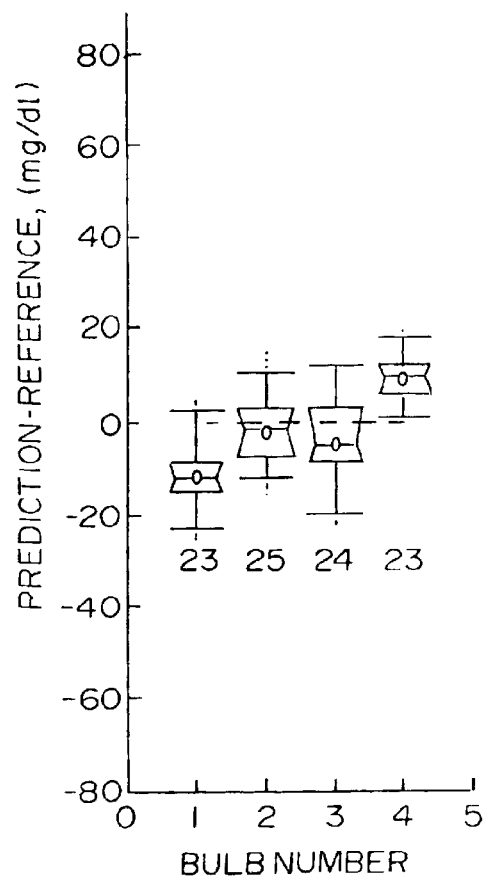
FIG. 25d is a box and whisker plot of a system using a ground glass diffuser plus and s-bend light pipe across four bulb changes.

The results of comparative testing between the system of FIG. 8 and that of FIG. 24 which incorporates the light pipe are included in the box and whisker plots of FIGS. 25a through 25d. FIGS. 25a and 25b are duplicates of FIGS. 9a and 9b to provide easy comparison with the results included in FIGS. 25c and 25d. Thus, FIG. 25a depicts the ability of the standard system with no bulb changes to predict glucose concentrations. FIG. 25b depicts the system ability across four bulb changes. FIG. 25c depicts the results of the system of FIG. 24 across four bulb changes. FIG. 25d shows the results of tests done on the system of FIG. 24, but with the addition of a ground glass diffuser 78 prior to the light pipe 91. FIGS. 25c and 25d clearly show that the embodiments of FIG. 24 are highly effective in improving the predictive accuracy of the apparatus and chemometric model over the system of FIG. 8. Further, the greatest benefit is derived when the ground glass diffuser 78 and the S-bend light pipe 91 are used together which results in the highest degree of homogenization of the light incident on the sample.

The performance of the illumination system to a known radiation emitter difference can be quantified. A method for quantifying the performance of the illumination system is to create both angular and spatial distribution plots under two known but different conditions. The differences between the two similar metric plots can be quantified. The known emitter difference to be used for quantification is a one-millimeter translation of the lamp filament.

Angular and spatial distribution plots can be created by using standard ray trace packages such as TracePro V2.1 or through direct measurements. The image of the illumination system beam can be measured by using any standard intensity mapping scheme and by using a goniometer. This allows both the spatial and angular distributions of the illumination output to be determined.

Optical modeling or direct measurement of the system should occur before and after movement of the filament. In order to standardize the calculation for many applications, the image should be divided into approximately one hundred equally sized "bins" (or squares), with ten bins across the diameter of the output image. This requirement is easily satisfied when performing ray trace analysis and can be accomplished by either measuring the beam in a ten by ten grid or by sampling at finer spacing and then averaging the data. The spatial and angular distributions for the initial emitter state are then subtracted from the corresponding distributions after movement of the lamp filament by one millimeter. The resulting images represent either the angular or spatial variance that occurred due to the emitter perturbation. In order to quantify the angular or spatial variance, all the data in the different images are put into a vector for easier calculation, and the vector is normalized so that its length equals 1. This normalization is achieved by dividing each data point by the 2-norm ($\|.\|_2$), which is equivalent to the Euclidean distance of the vector, $$\|x\|_2 = \left(\sum_{i=1}^{n} \|x_i\|^2\right)^{1/2} \quad (1)$$

where X is the vector of the difference image and n is the number of data points in the vector.

The normalization step ensures that the magnitude of every difference-image is comparable. Following the normalization step, the standard deviation of the normalized image vector is calculated, and this metric is an indication of the amount of variance introduced by the known emitter difference, $$\text{Metric} = \frac{\sum_{i=1}^{n}(x_i/\|x\|_2 - \text{mean}(x_i/\|x\|_2))^2}{n-1} \quad (2)$$

The standard deviation of the normalized image vector for both angular and spatial distributions was calculated for three different illumination systems.

1. Acceptable System: This illumination system is a light source (40-watt tungsten-halogen bulb) focused by an elliptical reflector into a ground glass diffuser, specified as a weak angular homogenizer, with subsequent coupling into a hexagonal light pipe with a length to diameter aspect ratio of 3 to 1. The system is modeled such that the filament image fully fills the input into the hexagonal light pipe.
2. Preferred System: the illumination system is the same as the acceptable except that the length to diameter aspect ratio is 7 to 1.
3. Ideal System: The illumination system is composed of a light source (40-watt tungsten-halogen bulb) focused by an elliptical reflector into a ground glass diffuser, specified as a strong angular homogenizer, with subsequent coupling into an s-bend hexagonal light pipe with a length to diameter aspect ratio of 7 to 1. The system is modeled such that the filament image fully fills the input into the hexagonal light pipe.

Based upon testing with these three illumination systems, the degree of homogenization can be generally classified as acceptable, preferred and ideal. Table 2 shows the standard deviations of the spatial distribution for the three systems. Table 3 shows the standard deviation for angular distribution.

TABLE 2

|  | Vertical Filament | Filament Rotation |
| --- | --- | --- |
| Acceptable | 0.053 | 0.050 |
| Preferred | 0.045 | 0.042 |
| Ideal | 0.039 | 0.034 |

TABLE 3

|  | Vertical Filament | Filament Rotation |
| --- | --- | --- |
| Acceptable | 0.044 | 0.066 |
| Preferred | 0.032 | 0.054 |
| Ideal | 0.027 | 0.050 |

There is another metric that can be used to evaluate the efficacy of an illumination system in reducing error inflation following bulb changes. This metric is known as the multivariate signal to noise (mSNR). The typical signal to noise (S/N) calculation is a univariate measure; it is defined as the maximum signal in a spectrum divided by the standard deviation of the baseline noise.

When a multivariate calibration is used, the signal from two or more wavelengths is used to quantify the analyte of interest. Because of this, unless the noise is random or 'white' noise, the standard deviation of the baseline (as used in univariate S/N calculations) is an inexact inappropriate noise estimate. Furthermore, the maximum signal in the spectrum is also an inexact inappropriate measure of the overall signal since the multivariate calibration uses signals from multiple wavelengths. The mSNR metric, however, uses the multivariate net analyte signal and the error covariance matrix and therefore gives a better estimate of the signal to noise for multivariate calibrations.

The net analyte signal is that part of the analyte spectrum which is orthogonal (contravariant) to the spectra of all interferents in the sample. If there are no interfering species, the net analyte spectrum is equal to the analyte spectrum. If interfering species with similar spectra to the analyte are present, the net analyte signal will be small. Because the calibration depends on the net analyte signal, the multivariate signal to noise metric takes this measure into account.

The mSNR can be calculated if two pieces of information are known. The net analyte signal (NAS) for the analyte of interest must be known, but this may be estimated from the regression vector, b (the model), $$NAS = \frac{\hat{b}}{\|\hat{b}\|_2^2} \tag{3}$$

where $\|.\|_2$ represents the 2-norm of the vector.

The error covariance matrix ($\Sigma$), which describes the error structure of the multi-wavelength spectral data, is also needed for the mSNR calculation, $$\Sigma = \epsilon^T * \epsilon \tag{4}$$

where $\epsilon$ is a vector containing the noise at each wavelength.

$$x = x_0 + \epsilon \tag{5}$$

where x is a measured spectrum, $x_0$ is the "true" spectrum in the absence of noise, and $\epsilon$ is the noise.

The error covariance matrix, $\Sigma$, measures how noise is correlated across wavelengths. The spectra used to calculate the error covariance matrix are spectra that have a constant amount of the analyte of interest and are obtained or processed in a manner to identify the spectral variances due to the variance of interest. In practice, a repeat sample should be used and the only variance introduced into the system should be the spectral variance being identified. In this invention, the variance source of interest is spectral variances due to emitter changes. Thus, spectral data from a repeat sample is obtained under different emitters. If the noise is uncorrelated, the error covariance matrix will have no off-diagonal elements, but in many cases, this will not be true. In such cases, the error may 'overlap' spectrally with the net analyte signal. In other words, this will introduce 'noise' into the measurement of this particular analyte. The 'Noise' may be calculated as, $$\text{Noise} = \sqrt{v^T \Sigma v} \tag{6}$$

where $$v = \frac{NAS}{\|NAS\|_2} \tag{7}$$

The mSNR at unit concentration may then be calculated by, $$mSNR = \frac{\|NAS\|_2}{\text{Noise}} = \frac{\|NAS\|_2}{\sqrt{v^T \Sigma v}} \tag{8}$$

The inverse of the net analyte spectrum, 1/mSNR, is an estimate of how much error will be added to prediction estimates if the type of noise in is present in the spectra being used to predict the analyte concentration (or other property).

When an illumination system is insensitive to emitter variances, there will be little effect on the spectral noise; in other words, the error covariance matrix, $\Sigma$, will be close to diagonal. In that case, the mSNR will be high. In the case where the system is sensitive to emitter variances or source fluctuations, correlated noise will be introduced and that will create off-diagonal elements which will be present in the error covariance matrix $\Sigma$. When these spectral variances or noise interferes (co-varyies) with the net analyte signal, the mSNR gets smaller and its inverse increases.

Table 4 shows the mSNR and 1/mSNR values calculated for four different illumination systems. These systems include a standard system with no bulb changes, the preferred embodiment system (with s-bend light pipe and diffuser) and also one that contained a straight light pipe (acceptable system).

TABLE 4

| System | mSNR | 1/mSNR |
| --- | --- | --- |
| No bulb change (Ideal level) | 0.2 | 5 |
| Bent light pipe & diffuser (Preferred level) | 0.033 | 30 |
| Straight light pipe only (Acceptable level) | 0.0166 | 60 |

It is clear that bulb changes influence each system differently. The mSNR is highest when no bulb change occurs, and lowest when the standard system with limited source homogenization is used. Conversely, the greatest inflation in prediction errors can be seen in that system (approximated by 1/mSNR).

These mSNR values were calculated using the study measuring the 98-solution set that was described previously. The NAS was calculated using the model (b) generated from the data set where a single bulb was used (equation (1)). This model had no knowledge of bulb changes, and so the net analyte signal corresponds to that in the absence of source fluctuations. For each illumination system, there were four bulb changes as described before. For each bulb, in addition to the 90-solution set, additional 'repeat' samples were measured. These 'repeats' were simply samples that contained all of the analytes at concentrations at the center of the calibration. Thus, to isolate the spectral variance due to bulb changes the spectral data was processed in the following manner. Multiple 'repeat' spectra at each bulb were measured, and the average repeat spectrum for each bulb was calculated using these data, hereafter referred to as the average bulb spectrum. Each average bulb spectrum can be thought of as the 'x' in equation 5. The mean repeat spectrum is simply the average spectrum of the average bulb spectra. To calculate the error, $\epsilon$, associated with each bulb, the mean repeat spectrum was subtracted from the average bulb repeat spectra, $$\varepsilon_i = x_i - \frac{\sum_{i=1}^{n} x_i}{n} \tag{9}$$

where n is the number of bulbs in the analysis (4 in this example). The $\Sigma$ matrix was then calculated using equation 4, and equations 6–8 were then calculated to find the mSNR.

Figure 26:
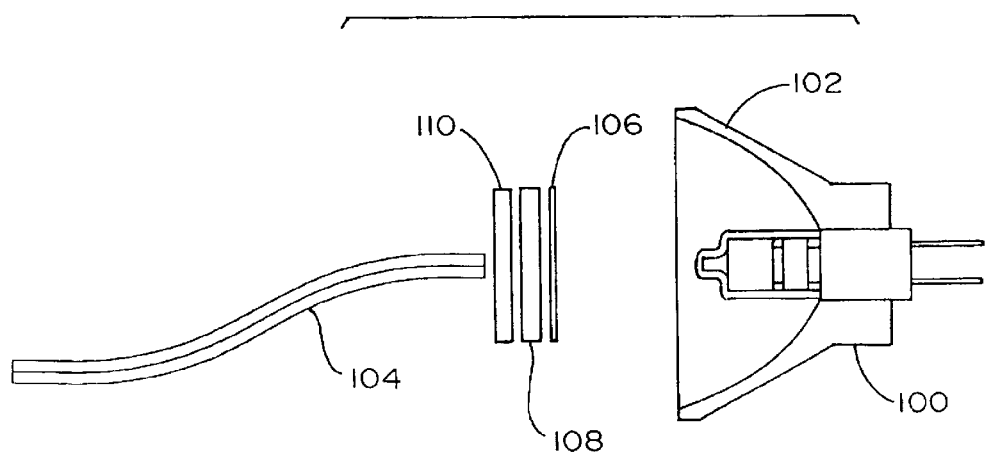
FIG. 26 is a diagrammed view of a system incorporating filters prior to the light pipe which eliminate unwanted wavelengths of radiation from the illumination source.

Now referring to FIG. 26, another aspect of the present invention is depicted. The system depicted provides spectral filtering or bandpass filtering to eliminate unnecessary wavelengths or bands of wavelengths from the light prior to contact with the tissue. This is accomplished by placing one or more elements between the light source and tissue. The elements can include absorptive filters fabricated of any transparent or partially transparent substrate; single layer or multi-layer dielectric coatings deposited on any transparent or partially transparent substrate; a grating or prism which disperses the radiation, permitting unwanted wavelengths to be blocked from reaching the tissue; and/or an aperture which selectively blocks undesirable radiation.

A preferred system for bandpass filtering is depicted in FIG. 26 which depicts a light source 100 placed within an electrical reflector 102. FIG. 26 also depicts a hexagonal S-bend light pipe 104 to receive light from the source 100. A series of filters are placed between the light source 100 and the light pipe 104. The first optical filter is a silicon filter 106 which is anti-reflection coated to transmit at least ninety percent (90%) of the in band incident light. The silicon filter passes wavelengths of light longer than 1.1 micron. The second optical filter is preferably a KOPP 4–67 colored glass filter 108 that, in combination with the silicon filter, passes light in the 1.2 to 2.5 micron spectral region. The slope of the KOPP filter is such that is preferentially passes light at wavelengths between 2.0 and 2.5 micron. The third optical filter is an ORIEL WG295 absorption filter 110 that cuts out wavelengths longer than 2.5 micron. The front surface of the WG295 filter can be polished or finely ground. If the front surface is finely ground, the WG295 acts as a diffuser as well as a light filter. It has been found that these filters prevent burning of the tissue, while enhancing the signal-to-noise ratio of the system by band limiting the light to only the spectral region of interest. The effect of band limiting the light is to reduce shot noise generated by the photon flux incident on the detector.

Figure 27:
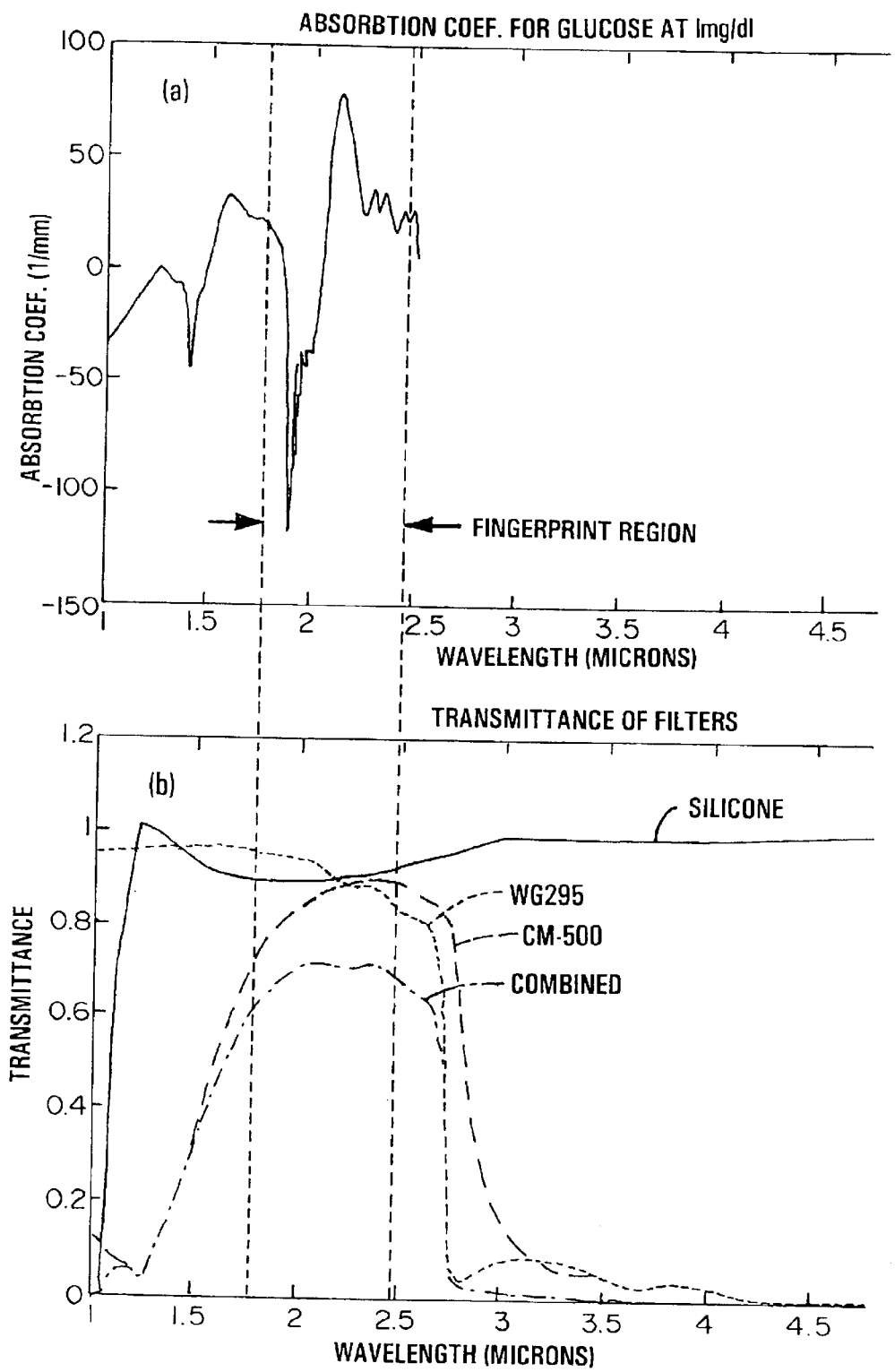
FIG. 27 graphically depicts the transmittance of selected wavelengths in a preferred fingerprint region.

An alternative combination of filters to achieve spectral bandpass filtering is depicted in FIG. 5. With this embodiment, the two silicon lenses 72,74 absorb wavelengths shorter than approximately 1.2 microns and longer than approximately 10 microns. The cyan filter 76 is an absorptive filter such as a Hoya CM-500 to absorb mid-infrared radiation at wavelengths of approximately 2.8 microns and longer. Further, a SCHOTT WG-295 absorptive filter 78 is included to absorb radiation at wavelengths approximately 2.7 micron and higher. FIG. 27 graphically depicts the individual and combined spectral transmission of the components shown in FIG. 5, along with the "spectral fingerprint" of glucose. As depicted in the graphs, this combination of absorptive filters and silicon lenses acts to block unwanted wavelengths, while still permitting transmission of radiation in the glucose fingerprint region. Similar combinations of filters can be utilized based on analytes of interest to be analyzed.

It is also recognized that other modifications can be made to the present disclosed system to accomplish desired homogenization of light. For example, the light source could be placed inside the light pipe in a sealed arrangement which would eliminate the need for the reflector. Further, the light pipe could be replaced by an integrator, wherein the source is placed within the integrator as disclosed in U.S. patent application Ser. No. 09/832,631, entitled "Encoded Variable Filter Spectrometer," filed on the same date herewith and incorporated by reference. Further, the present system could be used in non-infrared applications to achieve similar results in different wavelength regions depending upon the type of analysis to be conducted.

Having thus described the preferred embodiments of the present invention, those of skill in the art will readily appreciate that yet other embodiments may be made and used within the scope of the claims hereto attached.

What is claimed is:

1. A spectroscopic system for measuring analyte concentration in a sample, the system comprising:
    a radiation source emitter, the emitter emitting radiation;
    a radiation homogenizer disposed to receive at least a portion of said emitted radiation, wherein the homogenizer angularly and spatially homogenizes at least a portion of said emitted radiation, wherein said homogenized radiation illuminates said sample; and
    a sample source, the sample source having an analyte; and
    a detector for receiving at least a portion of the radiation subsequent to interacting with said sample.

2. The spectroscopic system of claim 1, wherein the radiation source emitter is a tungsten-halogen lamp.

3. The spectroscopic system of claim 1, wherein the emitted radiation possesses a band of wavelengths within the infrared regions of the electromagnetic spectrum.

4. The spectroscopic system of claim 1, wherein the spectroscopic system includes a means for concentrating the radiation emitted by the radiation source emitter.

5. The spectroscopic system of claim 1, wherein the spectroscopic system includes a means for channeling the emitted radiation to the sample source.

6. The spectroscopic system of claim 5, wherein the channeling means is at least one fiber optic wire.

7. The spectroscopic system of claim 5, wherein the channeling means is at least one mirror.

8. The spectroscopic system of claim 5, wherein the channeling means is at least one optic lens.

9. The spectroscopic system of claim 1, wherein the radiation homogenizer is a light pipe, wherein the light pipe has a proximal end, a distal end, and a length of material therebetween, the light pipe further having a cross-sectional area.

10. The spectroscopic system of claim 9, wherein the light pipe includes a plurality of bends.

11. The spectroscopic system of claim 10, wherein the plurality of bends form an S-shaped bend.

12. The spectroscopic system of claim 9, wherein the cross-sectional area of the light pipe is polygonal in shape.

13. The spectroscopic system of claim 1, wherein the sample is biological tissue.

14. The spectroscopic system of claim 1, wherein the sample is a human appendage, or a portion thereof.

15. The spectroscopic system of claim 1, wherein the analyte measured is glucose.

16. The spectroscopic system of claim 1, wherein the analyte measured is alcohol.

17. The spectroscopic system of claim 1, wherein the spectroscopic system includes at least one bandpass filter.

18. A method for homogenizing radiation for spectroscopic analysis, the method comprising the steps of:

providing a spectroscopic system, wherein the system comprises a radiation source emitter, a radiation homogenizer, a sample having an analyte concentration, and a radiation detector;

emitting radiation by means of the radiation source emitter;

angularly homogenizing the emitted radiation;

spatially homogenizing the emitted radiation;

illuminating the sample source with the homogenized radiation; and detecting the analyte concentration within the sample source.

19. The method for homogenizing radiation for spectroscopic analysis of claim 18, wherein the radiation homogenizer is a light pipe.

20. An optical measurement system used to measure an analyte or attribute in a biological system, the system comprising:

a spectrometer including a source and a collection system;

a sampling system for performing reflectance measurements on tissue;

a measurement system for measuring multiple wavelengths in the range for 4000 $cm^{-1}$ to 7500 $cm^{-1}$;

a prediction process that uses multiple variables obtained from the measurement system; and an illumination system that does not introduce prediction errors of clinical significance when used in a standard manner.

21. The illumination system of claim 20, wherein the illumination system uses both angular and spatial homogenization of the source output.

22. The system of claim 21, wherein standard operation would include bulb aging and replacement of the bulb.

23. The system of claim 21, wherein the analyte of interest is glucose and a prediction error of clinical significance is 10 mg/dl.

* * * * *

UNITED STATES PATENT AND TRADEMARK OFFICE
CERTIFICATE OF CORRECTION

PATENT NO. : 6,862,091 B2
DATED : March 1, 2005
INVENTOR(S) : Robert D. Johnson

It is certified that error appears in the above-identified patent and that said Letters Patent is hereby corrected as shown below:

Column 2,
Lines 51 and 54, delete "modem", and insert therefor -- modern --.

Column 6,
Lines 10-11, delete "calorimetric", and insert therefor -- colormetric --.
Line 45, delete "farther", and insert therefor -- further --.

Column 9,
Line 21, delete "DERAILED", and insert therefor -- DETAILED --.

Signed and Sealed this

Twenty-fourth Day of May, 2005

JON W. DUDAS
*Director of the United States Patent and Trademark Office*